US 8,456,510 B2

(12) United States Patent
King et al.

(10) Patent No.: US 8,456,510 B2
(45) Date of Patent: Jun. 4, 2013

(54) VIRTUAL DISTRIBUTED MULTIPOINT CONTROL UNIT

(75) Inventors: Keith C. King, Austin, TX (US); Ashish Goyal, Bangalore (IN); Hrishikesh Gopal Kulkarni, Bangalore (IN)

(73) Assignee: LifeSize Communications, Inc., Austin, TX (US)

(*) Notice: Subject to any disclaimer, the term of this patent is extended or adjusted under 35 U.S.C. 154(b) by 639 days.

(21) Appl. No.: 12/712,947

(22) Filed: Feb. 25, 2010

(65) Prior Publication Data
US 2010/0225736 A1 Sep. 9, 2010

Related U.S. Application Data

(60) Provisional application No. 61/157,511, filed on Mar. 4, 2009.

(51) Int. Cl.
*H04N 7/14* (2006.01)

(52) U.S. Cl.
USPC ............. 348/14.09; 348/14.08; 370/261; 370/265; 370/266; 709/202; 709/203; 709/205

(58) Field of Classification Search
USPC ............. 348/14.01–14.16; 370/259–271, 370/351–356; 709/201–207, 217–248; 379/201.01, 202.01–207.01
See application file for complete search history.

(56) References Cited

U.S. PATENT DOCUMENTS

| 4,449,238 A | 5/1984 | Lee et al. |
|---|---|---|
| 4,686,698 A | 8/1987 | Tompkins et al. |
| 4,893,326 A | 1/1990 | Duran et al. |
| 5,003,532 A | 3/1991 | Ashida et al. |
| 5,014,267 A | 5/1991 | Tompkins et al. |
| 5,200,989 A | 4/1993 | Milone |
| 5,239,623 A | 8/1993 | Sato et al. |
| 5,365,265 A | 11/1994 | Shibata et al. |

(Continued)

FOREIGN PATENT DOCUMENTS
JP 5181639 7/1993

OTHER PUBLICATIONS

"A history of video conferencing (VC) technology" <http://web.archive.org/web/20030622161425/http://myhome.hanafos.com/~soonjp/vchx.html> (web archive dated Jun. 22, 2003); 5 pages.

(Continued)

*Primary Examiner* — Hemant Patel
(74) *Attorney, Agent, or Firm* — Meyertons Hood Kivlin Kowert & Goetzel, P.C.; Jeffrey C. Hood; Joel L. Stevens

(57) ABSTRACT

A virtual distributed multipoint control unit in a videoconference may be implemented using a master endpoint, one or more facilitator endpoints, and one or more leaf endpoints. The facilitator endpoint(s) may receive video and/or audio from the leaf endpoints (which may provide/receive videoconference audio and video to one or more local participants). The master endpoint may receive video and/or audio from one or more facilitator endpoints (which may include cumulative video stream from multiple leaf endpoints) and/or directly from one or more leaf endpoints. The master endpoint may arrange received video and/or audio and provide cumulative video and/or audio streams to the leaf endpoints (e.g., directly and/or through the facilitator endpoints). The virtual distributed multipoint control unit may support a conference with more leaf endpoints than the master endpoint has input ports and/or decoders.

27 Claims, 25 Drawing Sheets

U.S. PATENT DOCUMENTS

| | | | |
|---|---|---|---|
| 5,374,952 A | 12/1994 | Flohr | |
| 5,382,972 A | 1/1995 | Kannes | |
| 5,398,309 A | 3/1995 | Atkins et al. | |
| 5,444,476 A | 8/1995 | Conway | |
| 5,453,780 A | 9/1995 | Chen et al. | |
| 5,473,363 A | 12/1995 | Ng et al. | |
| 5,491,508 A * | 2/1996 | Friedell et al. | 348/14.09 |
| 5,515,099 A | 5/1996 | Cortjens et al. | |
| 5,528,740 A | 6/1996 | Hill et al. | |
| 5,534,914 A | 7/1996 | Flohr et al. | |
| 5,537,440 A | 7/1996 | Eyuboglu et al. | |
| 5,572,248 A | 11/1996 | Allen et al. | |
| 5,581,671 A | 12/1996 | Goto et al. | |
| 5,594,859 A | 1/1997 | Palmer et al. | |
| 5,600,646 A | 2/1997 | Polomski | |
| 5,608,653 A | 3/1997 | Palmer et al. | |
| 5,617,539 A | 4/1997 | Ludwig et al. | |
| 5,625,410 A | 4/1997 | Washino et al. | |
| 5,629,736 A | 5/1997 | Haskell et al. | |
| 5,640,543 A | 6/1997 | Farrell et al. | |
| 5,649,055 A | 7/1997 | Gupta et al. | |
| 5,657,096 A | 8/1997 | Lukacs | |
| 5,684,527 A | 11/1997 | Terui et al. | |
| 5,689,641 A | 11/1997 | Ludwig et al. | |
| 5,719,951 A | 2/1998 | Shackleton et al. | |
| 5,737,011 A | 4/1998 | Lukacs | |
| 5,751,338 A | 5/1998 | Ludwig, Jr. | |
| 5,764,277 A | 6/1998 | Loui et al. | |
| 5,767,897 A | 6/1998 | Howell | |
| 5,768,263 A | 6/1998 | Tischler et al. | |
| 5,812,789 A | 9/1998 | Diaz et al. | |
| 5,821,986 A | 10/1998 | Yuan et al. | |
| 5,828,838 A | 10/1998 | Downs et al. | |
| 5,831,666 A | 11/1998 | Palmer et al. | |
| 5,838,664 A | 11/1998 | Polomski | |
| 5,841,763 A | 11/1998 | Leondires et al. | |
| 5,859,979 A | 1/1999 | Tung et al. | |
| 5,870,146 A | 2/1999 | Zhu | |
| 5,896,128 A | 4/1999 | Boyer | |
| 5,900,907 A | 5/1999 | Malloy et al. | |
| 5,914,940 A | 6/1999 | Fukuoka et al. | |
| 5,990,931 A | 11/1999 | Nimri et al. | |
| 5,991,277 A | 11/1999 | Maeng et al. | |
| 5,995,608 A | 11/1999 | Detampel, Jr. et al. | |
| 6,025,870 A | 2/2000 | Hardy | |
| 6,038,532 A | 3/2000 | Kane et al. | |
| 6,043,844 A | 3/2000 | Bist et al. | |
| 6,049,694 A | 4/2000 | Kassatly | |
| 6,078,350 A | 6/2000 | Davis | |
| 6,101,480 A | 8/2000 | Conmy et al. | |
| 6,122,668 A | 9/2000 | Teng et al. | |
| 6,128,649 A | 10/2000 | Smith et al. | |
| 6,151,619 A | 11/2000 | Riddle | |
| 6,160,573 A | 12/2000 | Allen et al. | |
| 6,195,184 B1 | 2/2001 | Chao et al. | |
| 6,243,129 B1 | 6/2001 | Deierling | |
| 6,281,882 B1 | 8/2001 | Gordon et al. | |
| 6,285,661 B1 | 9/2001 | Zhu et al. | |
| 6,286,034 B1 | 9/2001 | Sato et al. | |
| 6,288,740 B1 | 9/2001 | Lai et al. | |
| 6,292,204 B1 | 9/2001 | Carleton et al. | |
| 6,300,973 B1 | 10/2001 | Feder et al. | |
| 6,314,211 B1 | 11/2001 | Kim et al. | |
| 6,343,314 B1 | 1/2002 | Ludwig | |
| 6,373,517 B1 | 4/2002 | Davis et al. | |
| 6,400,996 B1 | 6/2002 | Hoffberg et al. | |
| 6,453,285 B1 | 9/2002 | Anderson et al. | |
| 6,480,823 B1 | 11/2002 | Zhao et al. | |
| 6,496,216 B2 | 12/2002 | Feder et al. | |
| 6,526,099 B1 | 2/2003 | Christopoulos et al. | |
| 6,535,604 B1 | 3/2003 | Provencal et al. | |
| 6,564,380 B1 | 5/2003 | Murphy | |
| 6,590,604 B1 | 7/2003 | Tucker et al. | |
| 6,594,688 B2 | 7/2003 | Ludwig et al. | |
| 6,603,501 B1 | 8/2003 | Parry et al. | |
| 6,646,997 B1 | 11/2003 | Baxley et al. | |
| 6,654,045 B2 | 11/2003 | Allen et al. | |
| 6,657,975 B1 | 12/2003 | Baxley et al. | |
| 6,677,979 B1 | 1/2004 | Westfield | |
| 6,711,212 B1 | 3/2004 | Lin | |
| 6,728,221 B1 | 4/2004 | Shaffer et al. | |
| 6,744,460 B1 | 6/2004 | Nimri et al. | |
| 6,757,005 B1 | 6/2004 | Elbaz et al. | |
| 6,760,415 B2 | 7/2004 | Beecroft | |
| 6,774,928 B2 | 8/2004 | Bruzzone | |
| 6,813,083 B2 | 11/2004 | Kobayashi | |
| 6,816,904 B1 | 11/2004 | Ludwig et al. | |
| 6,847,403 B1 | 1/2005 | Forsberg, Jr. et al. | |
| 6,909,552 B2 | 6/2005 | Dohi et al. | |
| 6,944,259 B2 | 9/2005 | Yang | |
| 6,967,321 B2 | 11/2005 | Leong et al. | |
| 6,989,856 B2 * | 1/2006 | Firestone et al. | 348/14.09 |
| 7,089,285 B1 | 8/2006 | Drell | |
| 7,133,062 B2 | 11/2006 | Castles et al. | |
| 7,176,957 B2 * | 2/2007 | Ivashin et al. | 348/14.09 |
| 7,312,809 B2 | 12/2007 | Bain et al. | |
| 7,321,384 B1 | 1/2008 | Wu et al. | |
| 7,330,541 B1 | 2/2008 | Surazski et al. | |
| 7,339,605 B2 | 3/2008 | Rodman et al. | |
| 7,353,251 B1 | 4/2008 | Balakrishnan | |
| 7,454,460 B2 * | 11/2008 | Ivashin | 709/203 |
| 7,477,282 B2 | 1/2009 | Firestone et al. | |
| 7,487,210 B2 * | 2/2009 | Ludwig et al. | 709/204 |
| 2002/0133247 A1 | 9/2002 | Smith et al. | |
| 2002/0188731 A1 | 12/2002 | Potekhin et al. | |
| 2003/0038807 A1 | 2/2003 | Demos | |
| 2003/0174146 A1 | 9/2003 | Kenoyer | |
| 2003/0232648 A1 | 12/2003 | Prindle | |
| 2004/0113939 A1 | 6/2004 | Zacks et al. | |
| 2004/0183897 A1 | 9/2004 | Kenoyer et al. | |
| 2004/0246332 A1 * | 12/2004 | Crouch | 348/14.08 |
| 2004/0263610 A1 | 12/2004 | Whynot et al. | |
| 2005/0012812 A1 | 1/2005 | Seo | |
| 2005/0024485 A1 | 2/2005 | Castles et al. | |
| 2005/0198134 A1 | 9/2005 | Kenoyer et al. | |
| 2005/0259144 A1 | 11/2005 | Eshkoli | |
| 2006/0013416 A1 | 1/2006 | Truong et al. | |
| 2006/0092269 A1 * | 5/2006 | Baird et al. | 348/14.08 |
| 2006/0184497 A1 | 8/2006 | Suzuki et al. | |
| 2006/0244817 A1 | 11/2006 | Harville et al. | |
| 2006/0277254 A1 | 12/2006 | Kenoyer et al. | |
| 2007/0009113 A1 | 1/2007 | Kenoyer | |
| 2007/0009114 A1 | 1/2007 | Kenoyer et al. | |
| 2007/0206089 A1 * | 9/2007 | Eshkoli et al. | 348/14.02 |
| 2007/0285501 A1 * | 12/2007 | Yim | 348/14.08 |
| 2008/0062252 A1 * | 3/2008 | Kawamura et al. | 348/14.09 |

OTHER PUBLICATIONS

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; <http://www.video.ja.net/intro/>; 2001; 26 pages.

Louis C. Yun and David G. Messerschmitt; "Architectures for Multi-Source Multi-User Video Compositing"; 1993; 9 pages; University of California at Berkley, Berkley CA.

"Polycom VideoPlus Continuous Presence"; Brochure; 2004; 3 pages; Pleasanton, CA.

Peter Klein; "Video Workplace Conference"; IEEE Proceedings of Globecom; 1985; pp. 109-112; Siemens AG, Germany.

"Videoconferencing Educational Technology—Basic Functions of the Polycom Remote Control Unit"; <http://www.medlib.iupui.edu/techsupport/vc/vcinstructions.html>; 2002; 3 pages.

E. J. Addeo, A. D. Gelman and A. B. Dayao; "A Multi-media Multi-point Communication Services Capability for Broadband Networks"; Mar. 1987; pp. 423-428; Bell Communications Research; Morristown, NJ.

E. F. Brown, J. O. Limb and B. Prasada; "A Continuous Presence Video Conferencing System"; National Telecommunications Conference Record; Dec. 1978; 5 pages; vol. 1.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

Robert D. Gaglianello and Glenn L. Cash; "Montage: Continuous Presence Teleconferencing Utilizing Compressed Domain Video Bridging"; IEEE International Conference on Communication; Jun. 1995; pp. 572-581; AT&T Bell Laboratories.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

Michael E. Lukacs; "The Personal Presence System—Hardware Architecture", Proceedings of the Second ACM International Conference on Multimedia; Oct. 1994; pp. 69-76; Bell Communications Research.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

Shaker Sabri and Birendra Prasada; "Video Conferencing Systems"; Proceedings of the IEEE; Apr. 1985; pp. 671-688; vol. 74, Issue 4.

Christoph Weiss; "Desk Top Video Conferencing—An Important Feature of Future Visual Communications"; IEEE International Conference on Communications; Apr. 1990; pp. 134-139; vol. 1.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

Elan Amir, Steven McCanne, and Hui Zhang; "An Application Level Video Gateway"; In Proceedings of ACM Multimedia '95; 1995; 18 pages.

Horng-Dar Lin and David G. Messerschmitt; "Video Composition Methods and Their Semantics"; International Conference on Acoustics, Speech, and Signal Processing; Apr. 1991; pp. 2833-2836; vol. 4.

"Polycom Executive Collection"; Jun. 2003; 4 pages; Polycom, Inc.; Pleasanton, CA.

Joe Duran and Charlie Sauer; "Mainstream Videoconferencing—A Developer's Guide to Distance Multimedia"; Jan. 1997; pp. 50-52; Addison Wesley Longman, Inc.

"Eye-to-Eye Video"; Retrieved from the Internet: <http://itotd.com/articles/254/eye-to-eye-video/>; Jul. 23, 2004; 6 pages.

"Free2C 3D-Display" (web archive: <http://www.hhi.fraunhofer.de/english/im/products/Cebit/free2C/free2C.html> dated Nov. 22, 2005); Fraunhofer Institute for Telecommunications; 4 pages.

"Guide to Videoconferencing"; 2005; 119 pages; University of Malta.

"MacSpeech Certifies Voice Tracker™ Array Microphone"; Apr. 20, 2005; 2 pages; MacSpeech Press.

Ronald Baecker, Ian Small, and Richard Mander; "Bringing Icons to Life"; Conference on Human Factors in Computing Systems; 1991; 6 pages.

N. A. Dodgson, N.E. Wiseman, S.R. Lang, D.C. Dunn, and A.R.L. Travis; "Autostereoscopic 3D Display in Laparoscopic Surgery"; Jun. 1995; 5 pages; CAR '95 (Computer Assisted Radiology), Berlin.

Neil A. Dodgson, John R. Moore, and Stewart R. Lang; "Time-Multiplexed Autostereoscopic Camera System"; Proceedings of the International Society for Optical Engineering; May 1997; p. 12.

Jefferson Han and Brian Smith; "CU-SeeMe VR Immersive Desktop Teleconferencing"; Proceeding of the Fourth ACM international conference on Multimedia; 1997; pp. 199-207.

David McAllister; "Display Technology: Stereo & 3D Display Technologies" North Carolina State University, http://web.archive.org/web/20031206213341/http://research.csc.ncsu.edu/stereographics/wiley.pdf (date or web archive Dec. 6, 2003); 50 pages.

Alexander Sawchuk, Isaac Cohen, Chris Kyriakakis, and Albert Rizzo; "Three Dimensional Interaction with Autostereoscopic Displays" (date unknown); 8 pages.

Lars Weinand; "3D Stereo Technology: Is it Ready for Prime Time?"; http://www.tomshardware.com/2005/05/02/3d_stereo_technology; May 2, 2005; 40 pages.

"Technical Handbook"; North Dakota Interactive Video Network; Jan. 2003; 38 pages.

Gong, Fengmin; "Multipoint Audio and Video Control for Packet-Based Multimedia Conferencing"; Proceedings of the 2nd Association for Computing Machinery International Conference on Multimedia; San Francisco, CA; 1994; pp. 425-432.

E. J. Addeo, A.D. Gelman and A.B. Dayao; "Personal Multi-media Multi-point Communication Services for Broadband Networks", Global Telecommunications Conference and Exhibition; Nov.-Dec. 1988; pp. 53-57; vol. 1.

Joe W. Duran and Michael Kenoyer; "A PC-compatible, multiprocessor workstation for video, data, and voice communication"; Proceedings of SPIE, Visual Communications and Image Processing IV; Nov. 1989; pp. 232-236; VideoTelecom Corp.

Aurel Lazar, Koon-Seng Lim and Franco Marconcini; "Realizing a Foundation for Programmability of ATM Networks with the Binding Architecture"; IEEE Journal on Selected Areas in Communications; Sep. 1996; pp. 1214-1227; vol. 14, No. 7.

Aurel A. Lazar, Koon-Seng Lim and Franco Marconcini; "xbind: The System Programmer's Manual"; Technical Report; Jun. 1996; 69 pages; Center for Telecommunications Research; Columbia University, New York.

Shigeki Masaki, Hiroyuki Yamaguchi, Yasuhito Hayashi, Takashi Nishimura, and Kazunori Shimamura; "Multimedia Handling Scheme in a Groupware System for B-ISDN"; IEEE Global Telecommunications Conference; Dec. 1992; pp. 747-751; NTT Human Interface Labs.

Aurel A. Lazar and Koon-Seng Lim; "Programmability and Service Creation for Multimedia Networks"; Fifth IEEE International Symposium on High Performance Distributed Computing; 1996; pp. 217-223.

U.S. Appl. No. 12/142,263, entitled "Virtual Decoders", by Keith C. King and Wayne E. Mock, filed Jun. 19, 2008.

U.S. Appl. No. 12/142,302, entitled "Video Conferencing System Which Allows Endpoints to Perform Continuous Presence Layout Selection", by Keith C. King and Wayne E. Mock, filed Jun. 19, 2008.

U.S. Appl. No. 12/142,340, entitled "Video Conferencing Device Which Performs Multi-way Conferencing", by Keith C. King and Wayne E. Mock, filed Jun. 19, 2008.

U.S. Appl. No. 12/142,377, entitled "Video Decoder Which Processes Multiple Video Streams", by Keith C. King and Wayne E. Mock, filed Jun. 19, 2008.

U.S. Appl. No. 12/171,358, entitled "Virtual Multiway Scaler Compensation", by Keith C. King and Wayne E. Mock, filed Jul. 11, 2008.

U.S. Appl. No. 11/858,342, entitled "Videoconferencing System Discovery", by Matthew K. Brandt, filed Sep. 20, 2007.

U.S. Appl. No. 61/157,511, entitled "Virtual Distributed Multipoint Control Unit", by Keith C. King, Ashish Goyal, and Hrishikesh Gopal Kulkarni, filed Mar. 4, 2009.

U.S. Appl. No. 61/157,516, entitled "Videoconferencing Endpoint Extension", by Keith C. King, Matthew K. Brandt, and Wayne E. Mock, filed Mar. 4, 2009.

U.S. Appl. No. 12/244,436, entitled "Systems and Methods for Selecting Videoconferencing Endpoints for Display in a Composite Video Image", by Ashish Goyal, Hrishikesh Gopal Kulkarni, and Shantha Kumari Harohalli Sathyanarayana Rao, filed Oct. 2, 2008.

U.S. Appl. No. 11/252,238, entitled "Video Conferencing System Transcoder", by Michael L. Kenoyer and Michael V. Jenkins, filed Oct. 17, 2005.

U.S. Appl. No. 11/693,074, entitled "Distributed Videoconferencing Processing", by Randall D. Groves, Michael L. Kenoyer, and Craig B. Malloy, filed Mar. 29, 2007.

U.S. Appl. No. 11/405,372, entitled "Live Video Icons for Signal Selection in a Videoconferencing System", by Wayne E. Mock and Michael L. Kenoyer, filed Apr. 17, 2006.

U.S. Appl. No. 11/348,217, entitled "Controlling Video Display Mode in a Video Conferencing System", by Michael L. Kenoyer, filed Feb. 6, 2006.

* cited by examiner

VIRTUAL DISTRIBUTED MULTIPOINT CONTROL UNIT

PRIORITY INFORMATION

This application claims benefit of priority of U.S. provisional application Ser. No. 61/157,511 titled "Virtual Distributed Multipoint Control Unit" filed Mar. 4, 2009, whose inventors were Keith C. King, Ashish Goyal, and Hrishikesh Gopal Kulkarni which is hereby incorporated by reference in its entirety as though fully and completely set forth herein.

BACKGROUND

1. Field of the Invention

The present invention relates generally to conferencing and, more specifically, to videoconferencing.

2. Description of the Related Art

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to one or more other (remote) participants. Each videoconferencing system may also include a display and speaker to reproduce video and audio received from remote participant(s). Each videoconferencing system may also be coupled to a computer system to allow additional functionality into the videoconference. For example, additional functionality may include data conferencing (including displaying and/or modifying a document for both participants during the conference).

SUMMARY

In various embodiments, a virtual distributed multipoint control unit may be implemented using a master endpoint, one or more facilitator endpoints, and one or more leaf endpoints. The virtual distributed multipoint control unit may support a conference with more endpoints (e.g., more leaf endpoints and facilitator endpoints) than the master endpoint has input ports and/or decoders. In other words, in one embodiment, the master endpoint and the one or more facilitator endpoints may operate together as a distributed "virtual MCU", wherein this "virtual MCU" can support more endpoints in the videoconference than would be possible by only the master endpoint alone. In one embodiment, the facilitator endpoint(s) may provide supplemental video and/or audio processing for the master endpoint, thus enabling a greater number of endpoints in the videoconference than the master endpoint would normally be able to handle.

The facilitator endpoint(s) may receive video and/or audio from the leaf endpoints (which may provide/receive videoconference video and audio to/from one or more local participants). The master endpoint may receive video and/or audio from one or more facilitator endpoints (which may include cumulative video and/or audio streams from multiple leaf endpoints) and/or directly from one or more leaf endpoints. The master endpoint may arrange received video and/or audio and provide cumulative video and/or audio streams to the leaf endpoints (e.g., directly and/or through the facilitator endpoints).

In some embodiments, the facilitator endpoint may generate a composite video image with two or more video images received from two or more respective leaf endpoints communicating with the facilitator endpoint in the videoconference. The facilitator endpoint may transmit the composite video image to the master endpoint. The master endpoint may receive the composite video image (and, for example, coordinate information for video images in the composite video image). The master endpoint may separate out the video images using the coordinate information. The master endpoint may generate a new composite video image with images from multiple leaf endpoints in the conference. The master endpoint may transmit the composite video image to the leaf endpoints in the conference (e.g., directly or through the facilitator endpoints). The leaf endpoints may separate out the video images of the composite video image and form a different composite video image to display (e.g., according to a local user preference).

In various embodiments, the facilitator endpoints may send received audio streams to the master endpoint. Cumulative audio streams may be created by the master endpoint and/or facilitator endpoint for the leaf endpoints in the videoconference. In some embodiments, the audio of a respective leaf endpoint may not be included in the cumulative audio stream sent to the respective leaf endpoint.

In some embodiments, a leaf endpoint may call a master endpoint or facilitator endpoint to start/join a videoconference. The master endpoint may assign the leaf endpoint to a facilitator endpoint based on at least one operable characteristic of the facilitator endpoint or leaf endpoint. The leaf endpoint may then call the assigned facilitator endpoint or be transferred to the facilitator endpoint by the master endpoint. If the master endpoint receives an indication that a facilitator endpoint in the videoconference will or has become unavailable, the master endpoint may locate a different facilitator endpoint to use in the videoconference. The master endpoint may send instructions to the respective leaf endpoints and/or substitute facilitator endpoint to establish the new communication link.

Figure 1A:
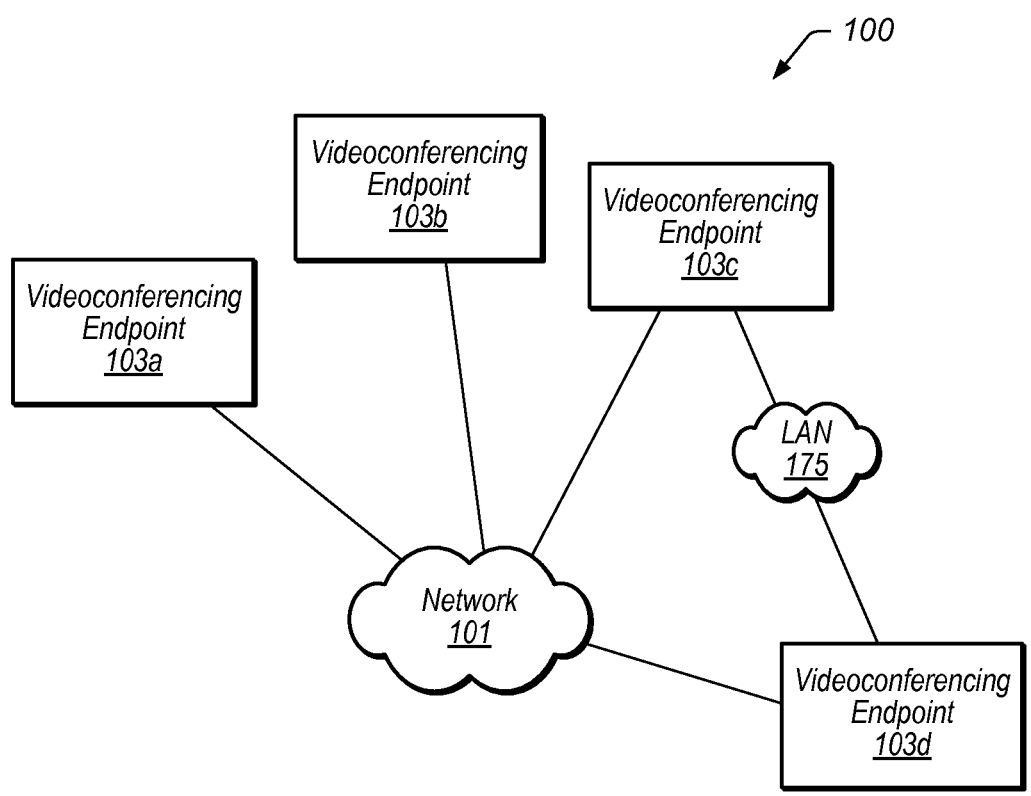
FIGS. 1a-c illustrate a videoconferencing endpoint network, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

U.S. patent application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. patent application titled "Video Conferencing System which Allows Endpoints to Perform Continuous Presence Layout Selection", Ser. No. 12/142,302, which was filed Jun. 19, 2008, whose inventors are Keith C. King and Wayne E. Mock, is hereby incorporated by reference in its entirety as though fully and completely set forth herein.

U.S. patent application titled "Video Conferencing Device which Performs Multi-way Conferencing", Ser. No. 12/142,340, which was filed Jun. 19, 2008, whose inventors are Keith C. King and Wayne E. Mock, is hereby incorporated by reference in its entirety as though fully and completely set forth herein.

U.S. patent application titled "Video Decoder which Processes Multiple Video Streams", Ser. No. 12/142,377, which was filed Jun. 19, 2008, whose inventors are Keith C. King and Wayne E. Mock, is hereby incorporated by reference in its entirety as though fully and completely set forth herein.

U.S. patent application titled "Virtual Multiway Scaler Compensation", Ser. No. 12/171,358, which was filed Jul. 11, 2008, whose inventors are Keith C. King and Wayne E. Mock, is hereby incorporated by reference in its entirety as though fully and completely set forth herein.

U.S. patent application titled "Integrated Videoconferencing System", Ser. No. 11/405,686, which was filed Apr. 17, 2006, whose inventors are Michael L. Kenoyer, Patrick D. Vanderwilt, Craig B. Malloy, William V. Oxford, Wayne E. Mock, Jonathan I. Kaplan, and Jesse A. Fourt is hereby incorporated by reference in its entirety as though fully and completely set forth herein.

U.S. Provisional Patent Application titled "Videoconferencing Endpoint Extension" (5896-11200), Ser. No. 61/157,516, which was filed Mar. 4, 2009, whose inventors are Keith C. King, Matthew K. Brandt, and Wayne E. Mock is hereby incorporated by reference in its entirety as though fully and completely set forth herein.

Figure 1B:
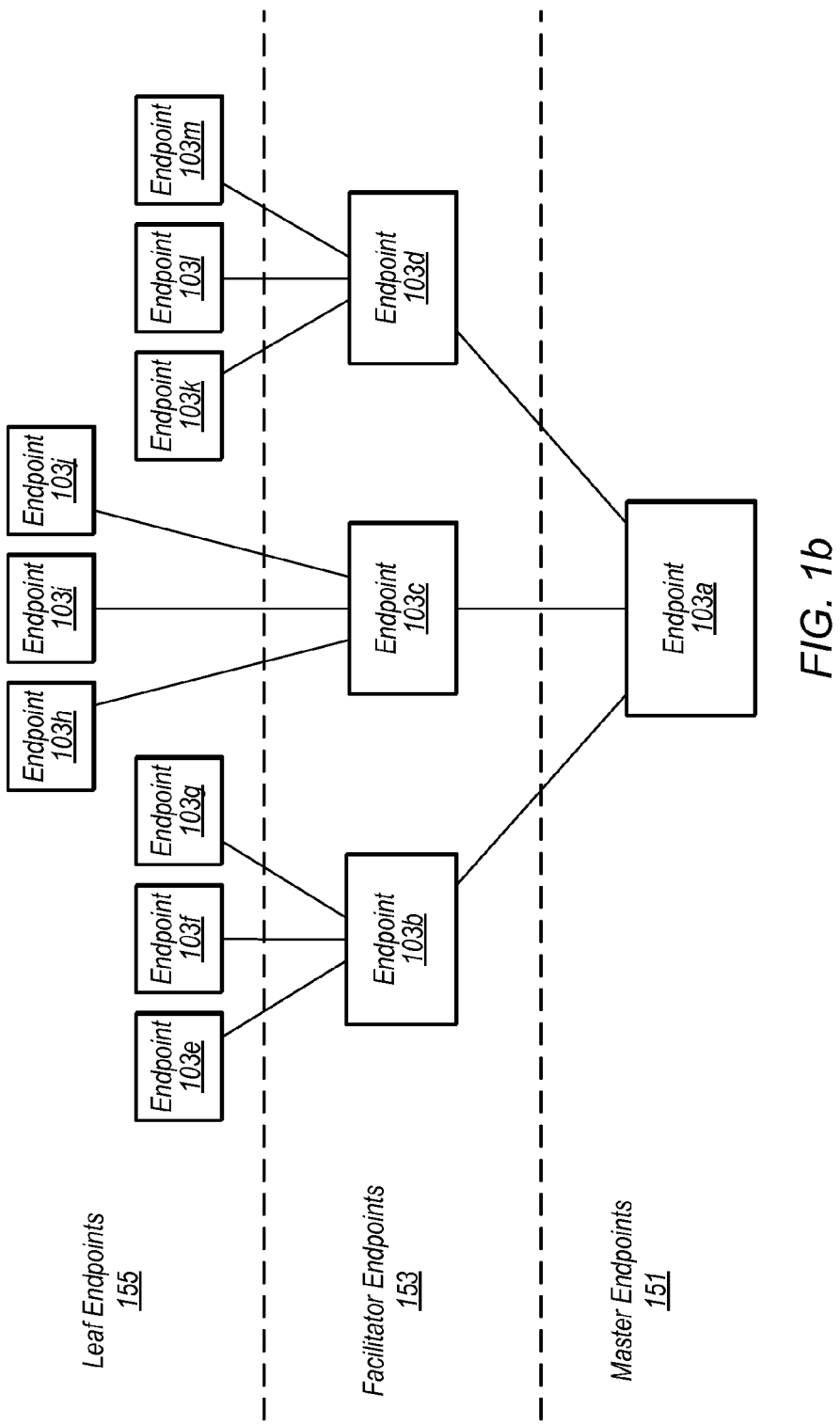
Figure 1C:
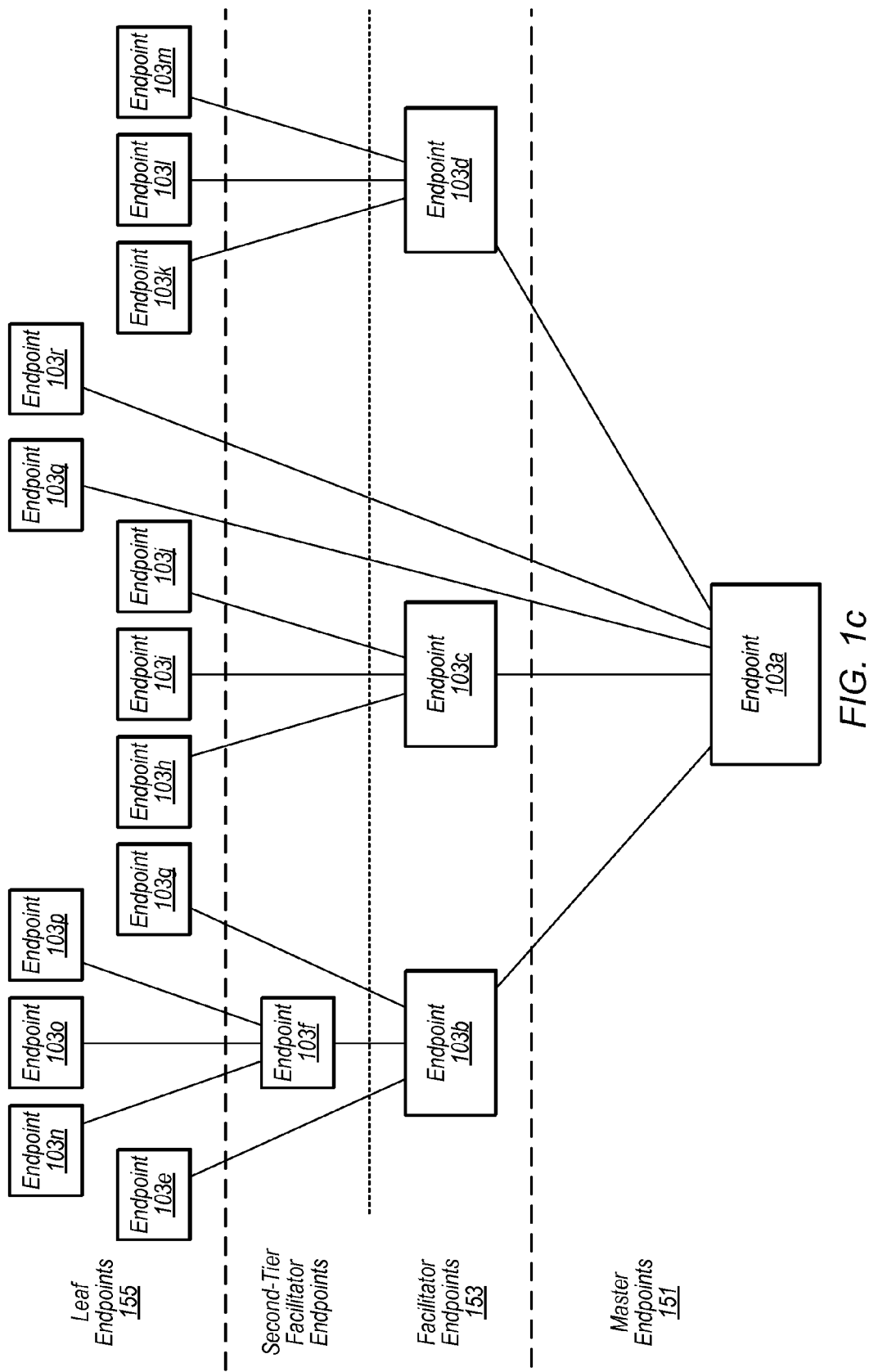

FIGS. 1a-c illustrate an embodiment of videoconferencing system network 100. FIGS. 1a-c illustrate an exemplary embodiment of videoconferencing system network 100 which may include network 101 and endpoints 103a-103d (e.g., videoconferencing systems) (other numbers of endpoints are also contemplated). Although not shown in FIGS. 1a-c, videoconferencing system network 100 may also include other devices, such as gateways, a service provider, conference units, and plain old telephone system (POTS) telephones, among others. Endpoints 103a-103d (these and other endpoints described herein referred to generally as "endpoints 103") may be coupled to network 101 (e.g., via gateways (not shown)). Gateways may each include firewall, network address translation (NAT), packet filter, and/or proxy mechanisms, among others.

Endpoints 103 may include videoconferencing system endpoints (also referred to as "participant locations"). Each endpoint 103 may include a camera, display device, microphone, speakers, and a codec or other type of videoconferencing hardware. In some embodiments, endpoints 103 may include video and voice communications capabilities (e.g., videoconferencing capabilities) and include or be coupled to various audio devices (e.g., microphones, audio input devices, speakers, audio output devices, telephones, speaker telephones, etc.) and include or be coupled to various video devices (e.g., monitors, projectors, displays, televisions, video output devices, video input devices, cameras, etc). In some embodiments, endpoints 103 may include various ports for coupling to one or more devices (e.g., audio devices, video devices, etc.) and/or to one or more networks. Endpoints 103 may each include and/or implement one or more real time protocols, e.g., session initiation protocol (SIP), H.261, H.263, H.264, H.323, among others. In an embodiment, endpoints 103 may implement H.264 encoding for high definition (HD) video streams. In some embodiments, a Multipoint Control Unit (MCU) may function as a to receive video from two or more sources (e.g., endpoints 103) and provide video (e.g., with composite video images) to two or more recipients (e.g., endpoints 103). "MCU" as used herein is intended to have the full breath of its ordinary meaning. In some embodiments, one or more endpoints 103 may include embedded MCU functionality.

Network 101 may include a wide area network (WAN) such as the Internet. Network 101 may include a plurality of networks coupled together, e.g., one or more local area networks (LANs) coupled to the Internet. Network 101 may also include public switched telephone network (PSTN). Network 101 may also include an Integrated Services Digital Network (ISDN) that may include or implement H.320 capabilities. In various embodiments, video and audio conferencing may be implemented over various types of networked devices.

In some embodiments, endpoints 103*a*-103*d* may each include various wireless or wired communication devices that implement various types of communication, such as wired Ethernet, wireless Ethernet (e.g., IEEE 802.11), IEEE 802.16, paging logic, RF (radio frequency) communication logic, a modem, a digital subscriber line (DSL) device, a cable (television) modem, an ISDN device, an ATM (asynchronous transfer mode) device, a satellite transceiver device, a parallel or serial port bus interface, and/or other type of communication device or method.

In various embodiments, the methods and/or systems described may be used to implement connectivity between or among two or more participant locations or endpoints, each having voice and/or video devices (e.g., endpoints 103*a*-103*d*) that communicate through network 101.

In some embodiments, videoconferencing system network 100 (e.g., endpoints 103*a*-*d*) may be designed to operate with network infrastructures that support T1 capabilities or less, e.g., 1.5 mega-bits per second or less in one embodiment, and 2 mega-bits per second in other embodiments (other capacities (e.g., 6 mega-bits per second, greater than 10 mega-bits per second) are also contemplated). The videoconferencing system may support HD capabilities. The term "high resolution" includes displays with resolution of 1280×720 pixels and higher. In one embodiment, high-definition resolution may include 1280×720 progressive scans at 60 frames per second, or 1920×1080 interlaced or 1920×1080 progressive. Thus, an embodiment of the present invention may include a videoconferencing system with HD "e.g. similar to HDTV" display capabilities using network infrastructures with bandwidths T1 capability or less. The term "high-definition" is intended to have the full breath of its ordinary meaning and includes "high resolution".

FIGS. 1*a*, 1*b*, and 1*c* illustrate configurations of videoconferencing networks. The videoconferencing networks may be operable to perform discovery, e.g., using one or more videoconferencing application(s) stored by videoconferencing systems in the network. As shown in FIG. 1*a*, endpoints 103*a*-*d* may be connected via network 101 (e.g., a wide area network such as the Internet) and endpoints 103*c* and 103*d* may be coupled over a local area network (LAN) 175. The networks may be any type of network (e.g., wired or wireless) as desired. These videoconferencing systems may discover each other according to embodiments described below, among others.

FIG. 1*b* illustrates an embodiment of relationships among videoconferencing system endpoints 103. As shown, endpoint 103*a* may be aware of endpoints 103*b*-*d*, each of which may be aware of further endpoints (e.g., 103*e*-*g*, 103*h*-*j*, and 103*k*-*m* respectively). FIG. 1*c* illustrates another embodiment showing multiple tiers of facilitator endpoints 153 (e.g., second tier facilitator endpoint 103*f*). Endpoint 103*a* may be operable to automatically discover one or more of endpoints 103*e*-*m* according to the methods described in U.S. patent application titled "Videoconferencing System Discovery", Ser. No. 11/858,342, which was filed Sep. 20, 2007, whose inventor is Matthew K. Brandt and which is hereby incorporated by reference in its entirety as though fully and completely set forth herein. In a similar manner, each of the other endpoints 103 shown in FIG. 1*b*, such as endpoint 103*h*, may be able to automatically discover a subset or all of the other ones of the endpoints 103 shown in FIG. 1*b*.

Figure 2:
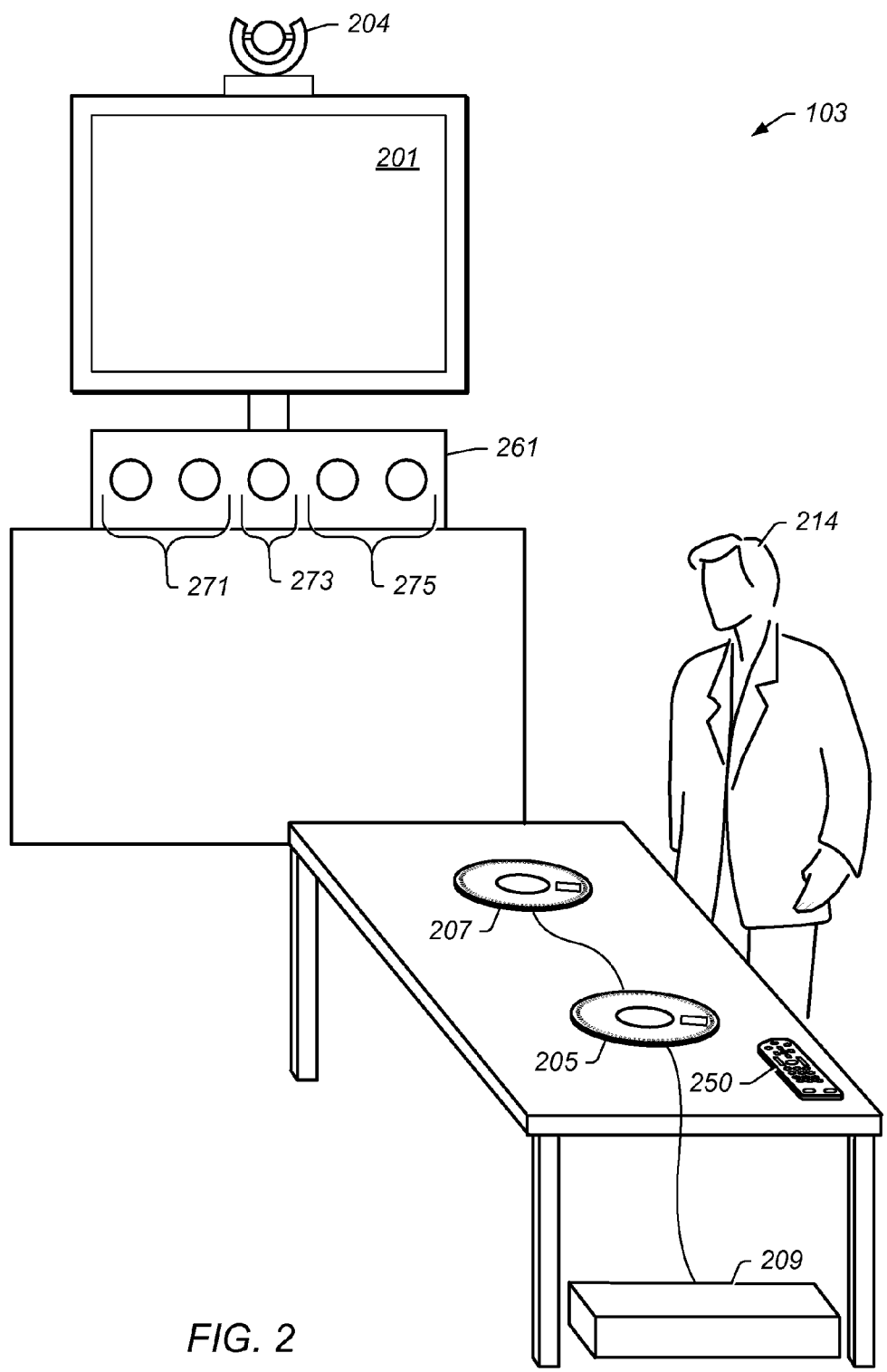
FIG. 2 illustrates a videoconferencing endpoint, according to an embodiment.

FIG. 2 illustrates an exemplary embodiment of videoconferencing system endpoint 103 (e.g., endpoint 103*a*), also referred to as a videoconferencing system, videoconferencing unit, or participant location. Endpoint 103 may have system codec box 209 to manage both speakerphones 205/207 and the videoconferencing hardware (e.g., camera 204, speakers 271, 273, 275, etc). Speakerphones 205/207 and other videoconferencing system components may be coupled to codec box 209 and may receive audio and/or video data from system codec box 209.

In some embodiments, endpoint 103 may include camera 204 (e.g., an HD camera) for acquiring video images of the participant location (e.g., of participant 214). Other cameras are also contemplated. Endpoint 103 may also include display 201 (e.g., an HDTV display). Images acquired by the camera 204 may be displayed locally on display 201 and may also be encoded and transmitted to other endpoints 103 in the videoconference.

Endpoint 103 may also include sound system 261. Sound system 261 may include multiple speakers including left speakers 271, center speaker 273, and right speakers 275. Other numbers of speakers and other speaker configurations may also be used. Endpoint 103 may also use one or more speakerphones 205/207 which may be daisy chained together.

In some embodiments, the videoconferencing endpoint components (e.g., camera 204, display 201, sound system 261, and speakerphones 205/207) may be coupled to system codec ("compressor/decompressor") box 209. System codec box 209 may be placed on a desk or on a floor. Other placements are also contemplated. System codec box 209 may receive audio and/or video data from a network (e.g., network 101). System codec box 209 may send the audio to speakerphone 205/207 and/or sound system 261 and the video to display 201. The received video may be HD video that is displayed on an HD display. System codec box 209 may also receive video data from camera 204 and audio data from speakerphones 205/207 and transmit the video and/or audio data over network 101 to another videoconferencing system endpoint 103. Videoconferencing system endpoint 103 may be controlled by a participant through the user input components (e.g., buttons) on speakerphones 205/207 and/or remote control 250. Other system interfaces may also be used.

In various embodiments, system codec box 209 may implement a real time transmission protocol. In some embodiments, system codec box 209 may include any system and/or method for encoding and/or decoding (e.g., compressing and decompressing) data (e.g., audio and/or video data). In some embodiments, system codec box 209 may not include one or more of the compressing/decompressing functions. In some embodiments, communication applications may use system codec box 209 to convert an analog signal to a digital signal for transmitting over various digital networks (e.g., network 101, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, endpoint 103 may capture a local image of the local participants and provide a video stream (e.g., to another endpoint 103). In some embodiments, endpoint 103 may create composite video image 407 (e.g., see FIGS. 4*a*-*d*) of two or more of the received video streams and provide composite video image 407 to each of endpoints 103.

Composite video image 407 may have certain layout 405. According to one embodiment, endpoint 103 may also generate coordinate information (or metadata) that describes the locations of the various images in composite video image 407. Endpoint 103 may use the coordinate information to separate out the plurality of images from composite video image 407, and then generate new composite video image having a new layout, e.g., as specified by the user. Endpoint 103 may also use a virtual decoder technique in separating out received composite video image 407, as described below.

Videoconferencing system 103 may execute various videoconferencing application software that presents a graphical user interface (GUI) on display 201. The GUI may be used to present an address book, contact list, list of previous callees (call list) and/or other information indicating other videoconferencing system endpoints 103 that the user may desire to call to conduct a videoconference. In one embodiment, videoconferencing system endpoint 103 may include software for performing automatic discovery of other videoconferencing system endpoints 103, and for populating this discovered information into the videoconferencing application address book, contact list, etc.

Figure 3:
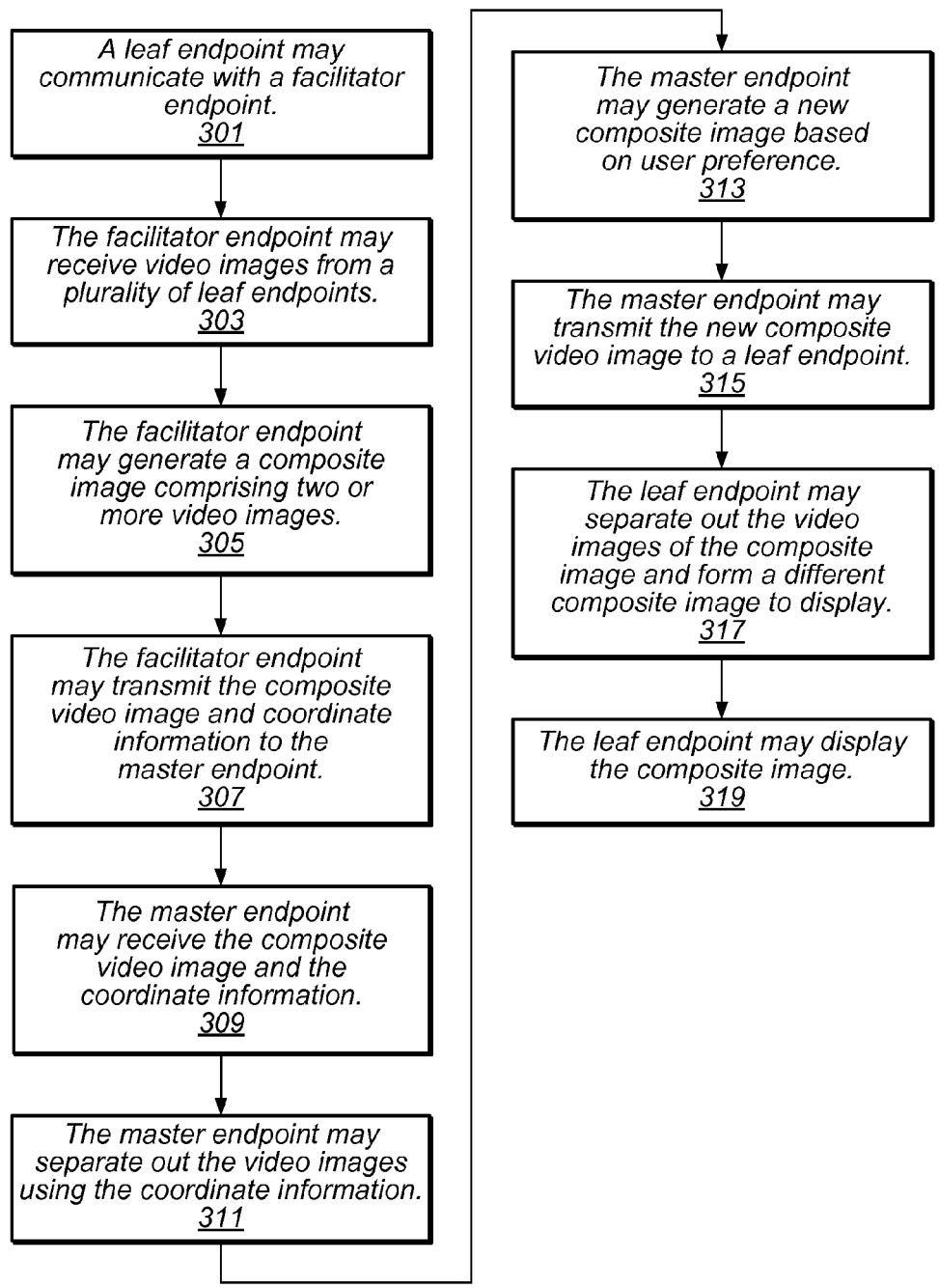
FIG. 3 illustrates a flowchart of a method for implementing a distributed virtual multipoint control unit to enable a videoconference between at least two leaf endpoints using a facilitator endpoint and a master endpoint, according to an embodiment.
Figure 4A:
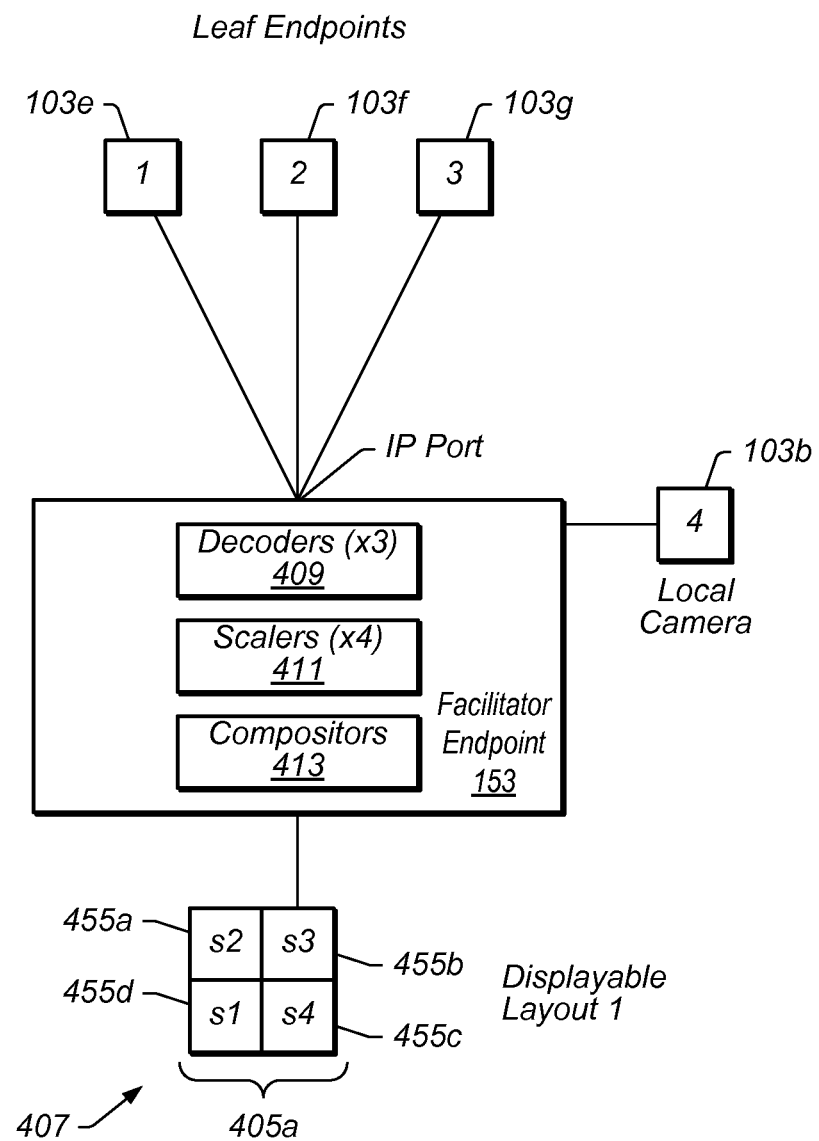
FIGS. 4a-d illustrate arrangements for encoders/decoders in videoconferencing endpoints, according to an embodiment.
Figure 4B:
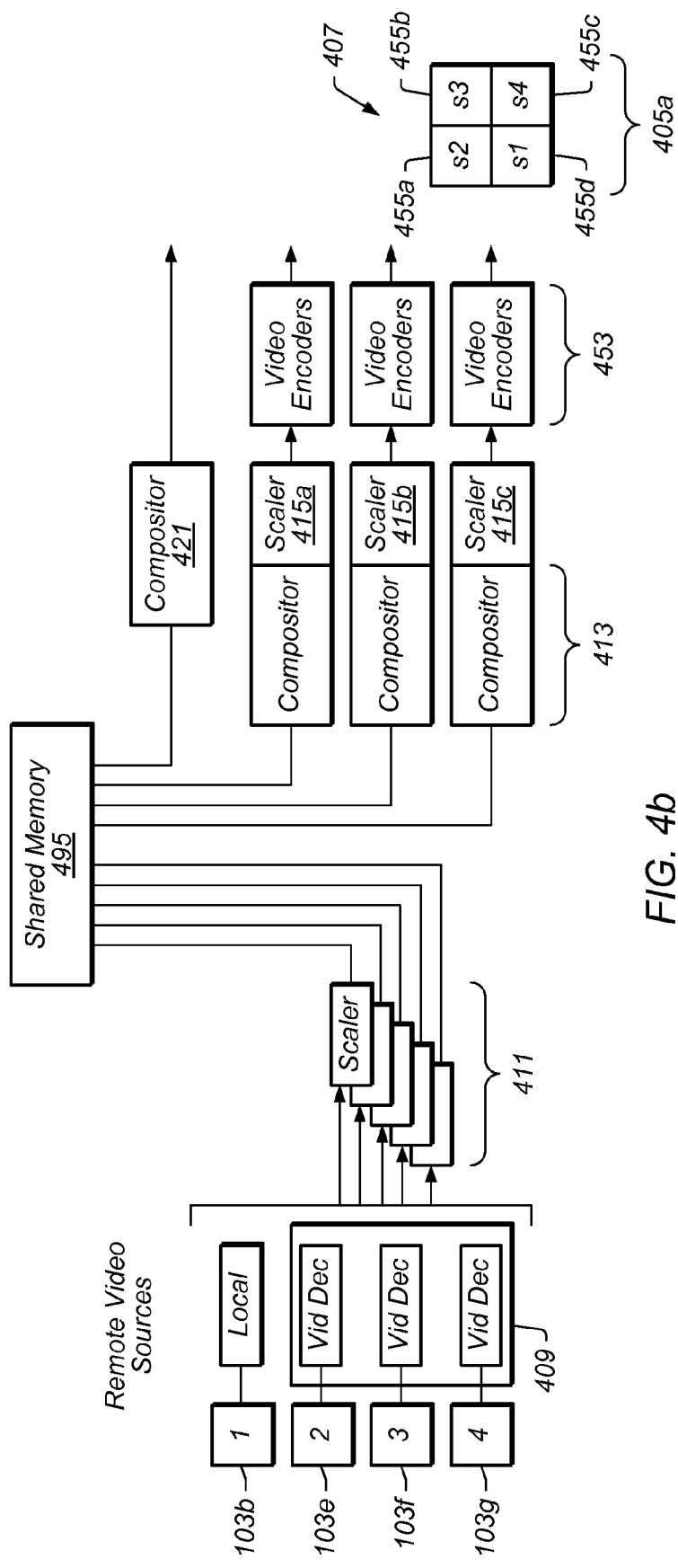
Figure 4C:
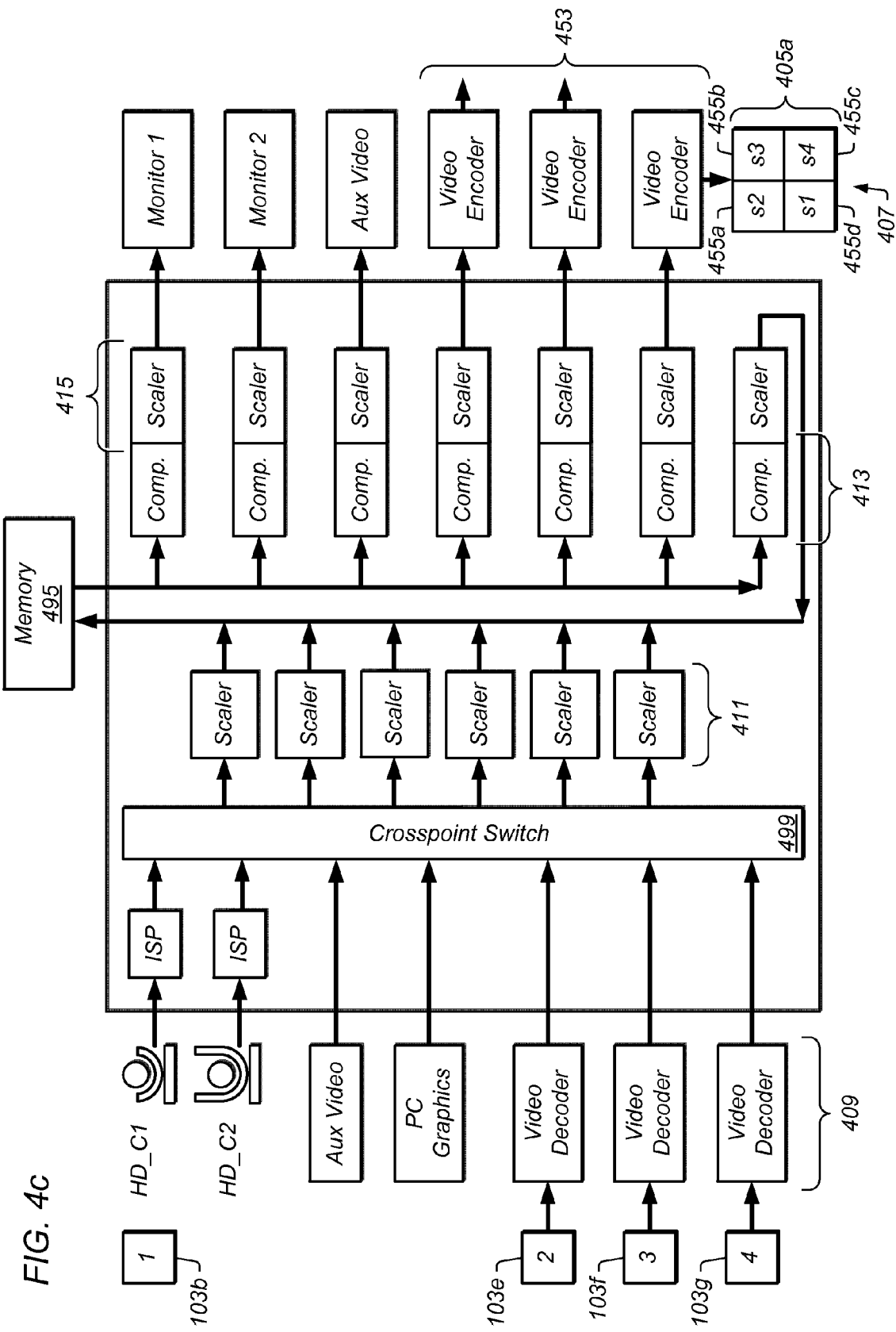
Figure 4D:
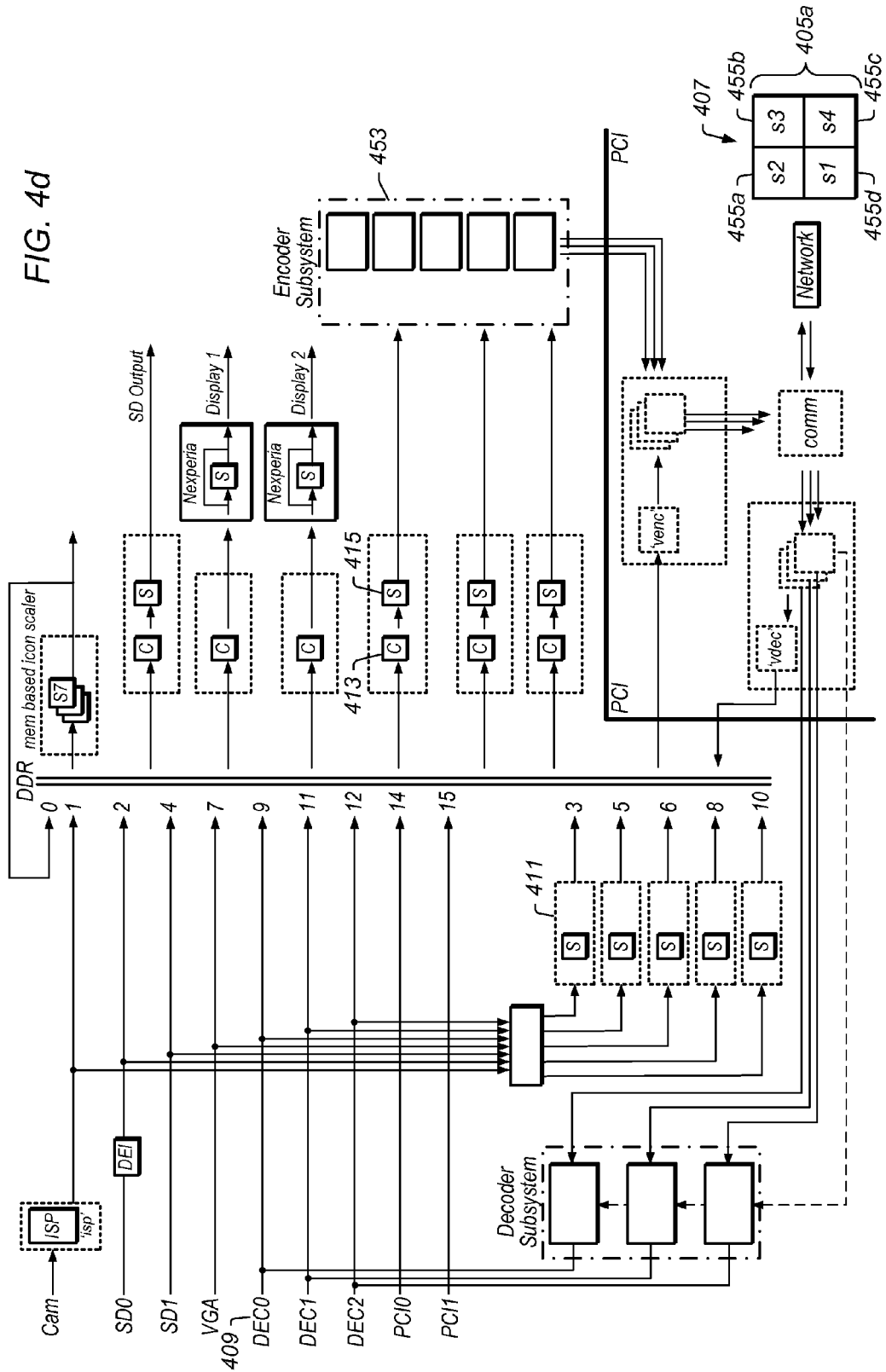

FIG. 3 illustrates a flowchart of a method for implementing a distributed virtual multipoint control unit to support a videoconference between leaf endpoints 155 using at least one facilitator endpoint 153 and master endpoint 151, according to an embodiment. In the various embodiments, endpoints 103 may serve as leaf endpoints 155, facilitator endpoints 153, and/or master endpoints 151. Endpoint 103 may be designated as master endpoint 151 or facilitator endpoint 153 by a user. Other designations are also contemplated (e.g., endpoint 103 receiving a call request for a videoconference may become master endpoint 151 for the videoconference (e.g., until different endpoint 103 is designated as master endpoint 151)).

Figure 16A:
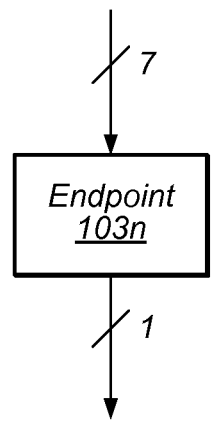
FIGS. 16a-b illustrate example videoconferencing units, according to various embodiments.
Figure 16B:
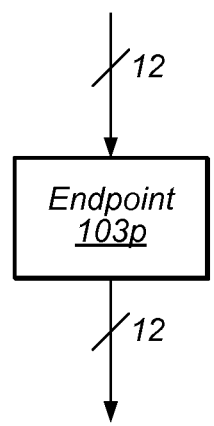

In some embodiments, master endpoint 151 may facilitate a videoconference call between multiple leaf endpoints 155 through one or more facilitator endpoints 153 (e.g., see FIGS. 1b-c). In some embodiments, participants may also participate in the videoconference at facilitator endpoints 153 and/or master endpoint 151 (which may also include a camera and/or microphones). Together, master endpoint 151 and facilitator endpoints 153 may operate as a distributed virtual multipoint control unit to perform multipoint control unit functions in a distributed and easily expandable manner. While the terms "leaf endpoint", "facilitator endpoint" and "master endpoint" are used to refer to endpoints performing various functions in the videoconference, it is to be understood that the "leaf endpoints", "facilitator endpoints" and "master endpoints" may include substantially similar videoconferencing systems. For example, in one embodiment, each of the "leaf endpoints", "facilitator endpoints" and "master endpoints" may be operable to receive 3 input signals and provide two output signals. Other numbers of input and output signal capabilities are also contemplated. For example, as seen in FIG. 16a, an endpoint may have 7 inputs and 1 output or as seen in FIG. 16b, an endpoint may have 12 inputs and 12 outputs. In some embodiments, the "leaf endpoints", "facilitator endpoints" and "master endpoints" may have different capabilities (e.g., each leaf endpoint 155 may have one input signal and one output signal and each master endpoint 151 may have 5 input signals and 10 output signals). Other capabilities are also contemplated. It should be noted that in various embodiments of the methods described below, one or more of the elements described may be performed concurrently, in a different order than shown, or may be omitted entirely. Other additional elements may also be performed as desired.

At 301, leaf endpoint 155 may communicate with facilitator endpoint 153 (e.g., through network 101). In some embodiments, leaf endpoint 155 may call master endpoint 151 and master endpoint 151 may redirect leaf endpoint 155 to facilitator endpoint 153 (e.g., by providing an Internet Protocol (IP) address of facilitator endpoint 153). In some embodiments, leaf endpoint 155 may call facilitator endpoint 153 directly. For example, leaf endpoint 155 may have been provided the facilitator endpoint IP address in advance of the videoconference call. In some embodiments, control software implemented by master endpoint 151, facilitator endpoint 153, and/or leaf endpoint 155 may pre-determine a conference configuration and may send the appropriate facilitator endpoint identification and/or contact information to leaf endpoints 155 prior to the videoconference call. For example, call statistics (e.g., call days/times, call lengths, number of participants per call, etc.) for multiple endpoints 103 may be maintained and used to predict which endpoints 103 may be available at the time of a scheduled conference call (e.g., call statistics may indicate that particular endpoint 103 is usually not being used on Thursday afternoons and, therefore, that endpoint 103 may be potential endpoint 103 to use for a videoconference call on Thursday afternoon). As another example, collected call statistics may indicate that endpoint 103 with 10 outputs usually has at least 5 available outputs in the mornings between 9 am and 10 am. This availability may make this endpoint 103 a potential endpoint 103 for 5 outputs for videoconference calls scheduled between 9 am and 10 am. In some embodiments, control software may analyze call statistics to determine potential endpoints 103 to use and/or reserve for a conference call. Other call statistic embodiments are also contemplated. In some embodiments, control software may determine specific master endpoint 151, facilitator endpoints 153, etc. for future calls or as calls are being received by master endpoint 151 during the videoconference call. In some embodiments, call statistics may also be used to reconnect endpoints 103 during a videoconference call to a different facilitator (or master) endpoint. For example, if facilitator endpoint 153 becomes unavailable, master endpoint 151 may reassign leaf endpoints 155 communicating through facilitator endpoint 153 to different facilitator endpoint 153.

In some embodiments, leaf endpoint 155 may transparently be transferred to facilitator endpoint 153 such that a user may not be immediately aware that the call has been transferred. In some embodiments, leaf endpoint 155 may be automatically connected to facilitator endpoint 153 according to a predetermined call configuration. A transfer and/or automatic call set-up may be transparent to a conference participant such that the conference participant may not need to take any actions to facilitate the virtual distributed call. In some embodiments, leaf endpoint 155 may provide one or more operating characteristics to facilitator endpoint 153 (e.g., resolution, audio encoding format, etc.) or the operating characteristics may be provided to facilitator endpoint 153 by master endpoint 151 (e.g., before or during transfer process).

In some embodiments, leaf endpoints 155 may participate in the videoconference by communicating with the master endpoint 151 (e.g., without communicating through a facilitator endpoint 153). In some embodiments, if a first leaf endpoint is communicating with the master endpoint 151 in the videoconference and a second leaf endpoint calls into the first leaf endpoint, the first leaf endpoint may be converted into a facilitator endpoint 153 for the videoconference. In some embodiments, the first leaf endpoint may thus support an MCU mode to support multiple leaf endpoints 155. The master endpoint 151 may consider the first leaf endpoint to be a facilitator endpoint 153.

At 303, facilitator endpoint 153 may receive video images from one or more leaf endpoints 155. Leaf endpoints 155 may be remote or local and the video may include video (e.g., from cameras) or presentations (e.g., from a Microsoft Powerpoint™ presentation). In some embodiments, multiple levels of facilitator endpoints 153 may be involved in the videoconference (e.g., as seen in FIG. 1c, endpoint 103f may serve as facilitator endpoint 153 for leaf endpoints 103n-p and may connect to master endpoint 151 through separate facilitator endpoint 103b). In some embodiments, leaf endpoints 155 may connect to master endpoint 151 without intervening facilitator endpoint 153 (e.g., endpoints 103q-r in FIG. 1c). In some embodiments, facilitator endpoint 153 (and/or master endpoint 151) may also provide video/audio to participants local to the facilitator endpoint 153 and/or master endpoint 151 in the videoconference call. For example, participants may interact with the videoconference at facilitator endpoint 153 and/or master endpoint 151 through videoconferencing equipment (e.g., cameras, monitors, speakers, etc.) attached to respective facilitator endpoint 153 and/or master endpoint 151. In some embodiments, video packet loss may be managed between the master endpoint 151 and the facilitator endpoint 153 and/or leaf endpoint 155 that sent the frame experiencing packet loss. For example, if video packet loss is detected by master endpoint 151, master endpoint 151 may request facilitator endpoint 153 or leaf endpoint 155 that sent the frame experiencing the packet loss to resend the video frame to the master endpoint 151. Packet loss may also be managed by facilitator endpoint 153 and/or leaf endpoint 155. For example, if video packet loss is detected by facilitator endpoint 153 in a video frame sent by leaf endpoint 155 communicating with facilitator endpoint 153, facilitator endpoint 153 may request leaf endpoint 155 to resend the video frame. If video packet loss is detected by the leaf endpoint 155 (e.g., in a video frame sent by master endpoint 155 or leaf endpoint 153), leaf endpoint 155 may request the video frame be resent (e.g., leaf endpoint 155 may request corresponding master endpoint 151 or facilitator endpoint 153 to resend the video frame).

In some embodiments, facilitator endpoint 153 may use one or more decoders 409 to decode received video images 455 from respective leaf endpoints 155. For example, video packets for the video frames including respective received video images 455 may be assembled as they are received (e.g., over an Internet Protocol (IP) port) into facilitator endpoint 153. FIGS. 4a-d illustrate embodiments of facilitator endpoints 153.

Figure 10:
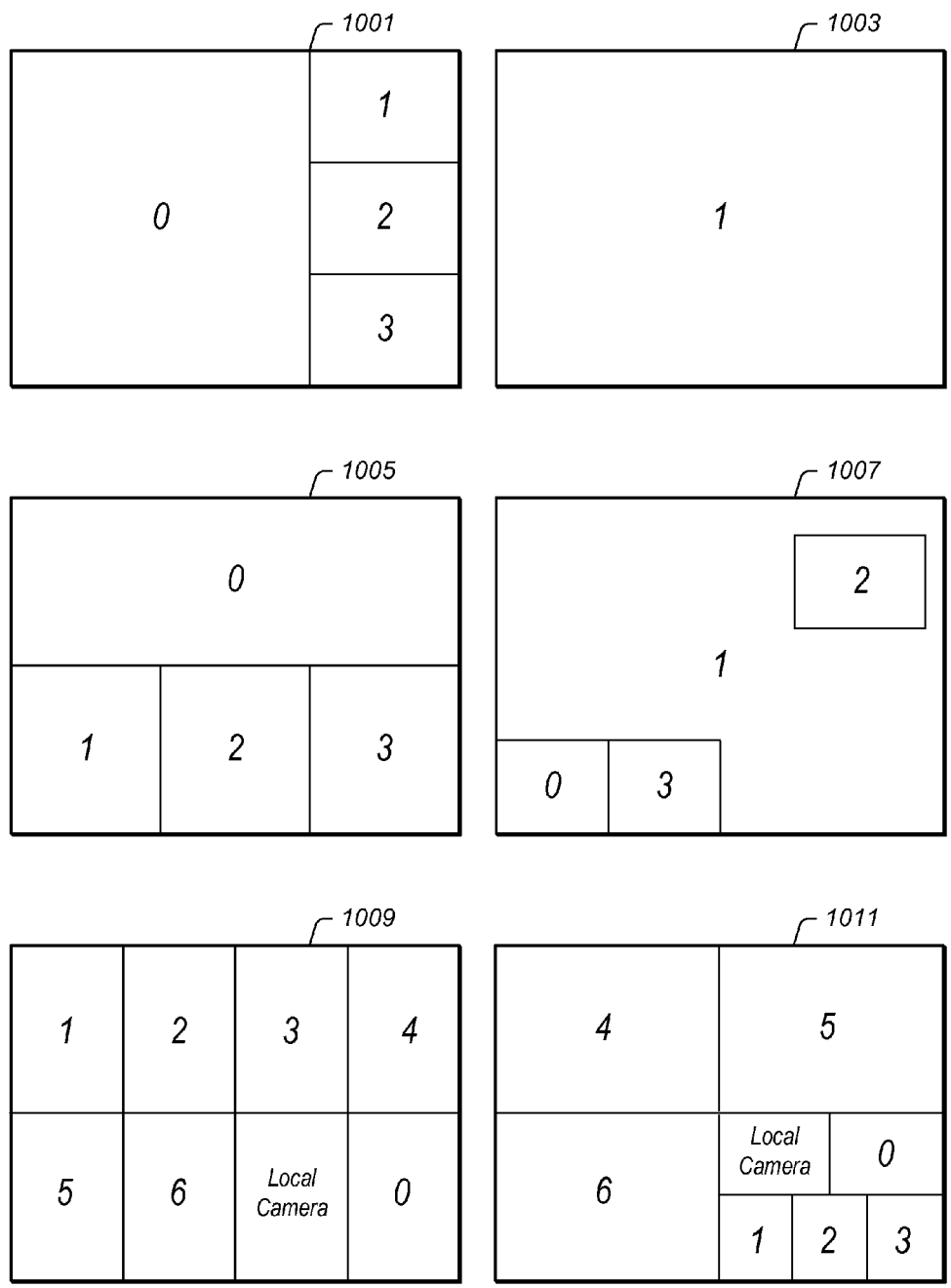
FIG. 10 illustrates various video image layouts, according to various embodiments.

In some embodiments, facilitator endpoint 153 may also receive video image layout preferences from one or more of leaf endpoints 155. For example, leaf endpoint 155 may receive a video image layout preference from one or more videoconferencing participants (e.g., through a menu on an on-screen interface) and may transmit that preference to facilitator endpoint 153. In some embodiments, a button on remote 250 may allow a videoconference participant to cycle through two or more available layout preferences. The video image layout preference may include a layout type (e.g., layout 1001, 1003, 1005, 1007, 1009, or 1011 as seen in FIG. 10). Other layout types are also possible. The video image layout preference may specify which endpoint's video image to place in each of the available layout positions (e.g., which endpoint video image should be placed in the main layout position and which endpoint video images should be placed in the other layout positions). In some embodiments, facilitator endpoint 153 may not receive a video image layout preference from one or more leaf endpoints 155. In some embodiments, the video image layout may be generated at facilitator endpoint 153 or master endpoint 151. For example, control software implemented on facilitator endpoint 153 or master endpoint 151 may determine which leaf endpoint 155 has the current speaker and may place the corresponding video image in a main video image window of the layout (e.g., with other endpoint video images arranged around the main video image). Other layout selections means are also contemplated.

In some embodiments, facilitator endpoint 153 may also be operable to receive other information from leaf endpoints 155. For example, leaf endpoints 155 may send data to facilitator endpoint 153 to move a far end camera (e.g., on another leaf endpoint 155). Facilitator endpoint 153 may subsequently transmit this information to respective leaf endpoint 155 to move the far end camera.

Figure 9:
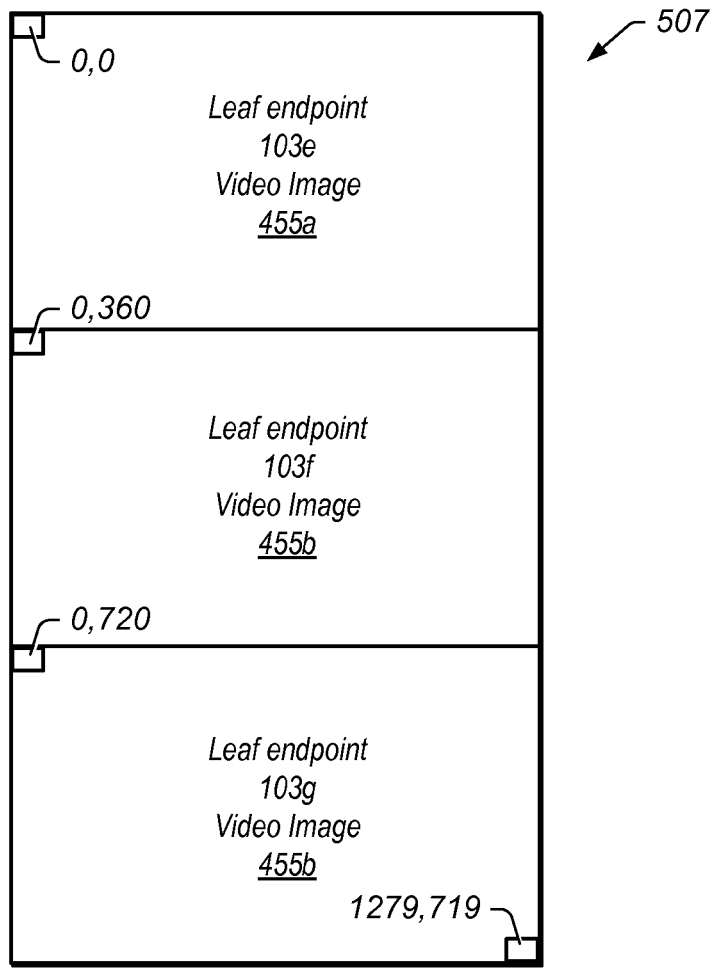
FIG. 9 illustrates a coordinate system for a video frame, according to an embodiment.

At 305, facilitator endpoint 153 may generate composite video image 407 with two or more video images 455 (e.g., from leaf endpoints 155 and/or from facilitator endpoint 153). In some embodiments, facilitator endpoint 153 may have multiple scalers 411 and compositors 413 to scale received video images 455 and composite two or more of video images 455 (e.g., from leaf endpoints 155) into, for example, layout 405a. In some embodiments, layout 405a may include video image 455 from each endpoint 103 communicating with facilitator endpoint 153 (e.g., each leaf endpoint 155 and/or facilitator endpoint 153). In some embodiments, layout 405a may be in a predetermined format. For example, if connected to three leaf endpoints 155, the video image of each leaf endpoint 155 may be scaled to a 1280 by 360 (pixel) image and composite video image 407 (e.g., including the three images stacked as seen in FIG. 9) may have dimensions of 1280 by 1080. Other formats are also contemplated.

In some embodiments, scalers 411 may be coupled to video decoders 409 (e.g., through crosspoint switch 499 shown in FIG. 4b) that decode video images 455 from the various video sources (e.g., endpoints 103). Scalers 411 may scale video images 455 after video images 455 are decoded. In some embodiments, one or more of video images 455 may not be scaled. For example, the two or more video images 455 may be rearranged into composite video image 407 without being scaled. In some embodiments, scalers 411 may be 7-15 tap scalers. Scalers 411 may use linear combinations (e.g., with similar or different coefficients) of a plurality of pixels in video image 455 for each pixel scaled. Other scalers 411 are also contemplated. In some embodiments, video images 455 may be stored in shared memory 495 after being scaled.

In some embodiments, compositors 413 may access video images 455 (e.g., from shared memory 495) to form composite video images 407. In some embodiments, the output of compositors 413 may again be scaled (e.g., by scalers 415) prior to being encoded by video encoders 453. The video data received by scalers 415 may be scaled according to the resolution requirements of the master endpoint 151. In some embodiments, the output of compositor 413 may not be scaled prior to being encoded and transmitted to the master endpoint 151. In some embodiments, composite video image layout 405a may be transmitted as video frame 507 through video stream 500 to the master endpoint 151.

In some embodiments, facilitator endpoint 153 may determine the coordinates of video images 455 in composite video image layout 405a. For example, coordinate information 519 may indicate the start/stop locations of one or more of video images 455 in video frame 507. This coordinate information 519 may be stored on facilitator endpoint 153. In some embodiments, the coordinates may be predetermined. For example, a standard format with standard start/stop coordinates may be used for the images in composite video image 407 such that coordinate information 519 may not need to be sent to receiving master endpoint 151 that is expecting composite video image 407 in the standard format.

At 307, facilitator endpoint 153 may transmit composite video image 407 and coordinate information 519 to master endpoint 151. In some embodiments, facilitator endpoint 153 may not transmit coordinate information 519 to master endpoint 151 (e.g., if composite video image 407 is in a standard format). Coordinate information 519 may identify the locations of specific video images 455 in received composite video image layout 405a. In some embodiments, coordinate information 519 may be transmitted as metadata 901 with composite video image layout 405a. Metadata 901 may include coordinate information 519 for video frame 507a with the start (and/or stop) information for respective video images 455 (e.g., video image boundaries and/or pixel start/stop points) corresponding to leaf endpoints 155 (and/or facilitator endpoint 153). Metadata 901 may also include attributes of each of the plurality of leaf endpoints 155 including identifying information respective to corresponding endpoints 103 for each video image 455. Other information in metadata 901 is also contemplated. In some embodiments, coordinate information 519 may be sent in a form other than metadata.

In some embodiments, facilitator endpoint 153 may send composite video image 407 to another facilitator endpoint (e.g., see endpoints 103f and 103b in FIG. 1c operating as facilitator endpoints). The second facilitator endpoint may access one or more video images in the composite video image (e.g., using coordinate information 519) for putting in a new composite video image (e.g., to send to master endpoint 151) or the second facilitator endpoint may put the composite video image into the new composite video image (and may pass the new composite video image and subsequent coordinate information to master endpoint 151).

At 309, master endpoint 151 may receive composite video image 407 and coordinate information 519 (e.g., in metadata 901). For example, video frame 507a including two or more video images 455 may be received. Video frame 507a may be received as a series of video packets 503a in video stream 500a at decoder 515a. Decoder 515a may assemble video packets 503a into their respective video frames 507a for further processing in virtual decoder 517a. As noted above, in some embodiments, coordinate information 519 may not be received with composite video image 407.

At 311, master endpoint 151 may separate out video images 455 using coordinate information 519. Virtual decoders 517a at master endpoints 151 may separate continuous presence layout 405a into two or more separate video images 455. In some embodiments, coordinate information 519 may be used to find video image boundaries of video images 455 within video frame 507a. In some embodiments, coordinate information 519 may be used to determine where video images 455 start and stop in video frame 507a. These start/stop locations may be used by virtual decoder 517a to separate video images 455 from video frame 507a. In some embodiments, the separate video images 455 may be defined and/or scaled out of composite video image 405a. For example, coordinate information 519 may be used by virtual decoder 517a to crop respective video images 455 (e.g., video images 455a and 455b) in video frame 507a. FIG. 9 illustrates an example of a use of coordinate information 519 to locate the boundaries of three video images (e.g., video images 455a-c) in order to separate video images 455. For example, leaf endpoint video image 455a may have a left boundary at 0, a top boundary at 0, a right boundary at 1279, and a bottom boundary at 359. Similarly, leaf endpoint video image 455b may have a left boundary at 0, a top boundary at 360, a right boundary at 1279, and a bottom boundary at 719. Coordinate information 519 (e.g., boundary information) for other video images (e.g., video image 455b) may also be provided (e.g., in metadata 901). In some embodiments, the three video images may be "stacked" in time (e.g., sent/received sequentially but not in the same composite video image 407). Other embodiments of compositing images are also contemplated.

Figure 5A:
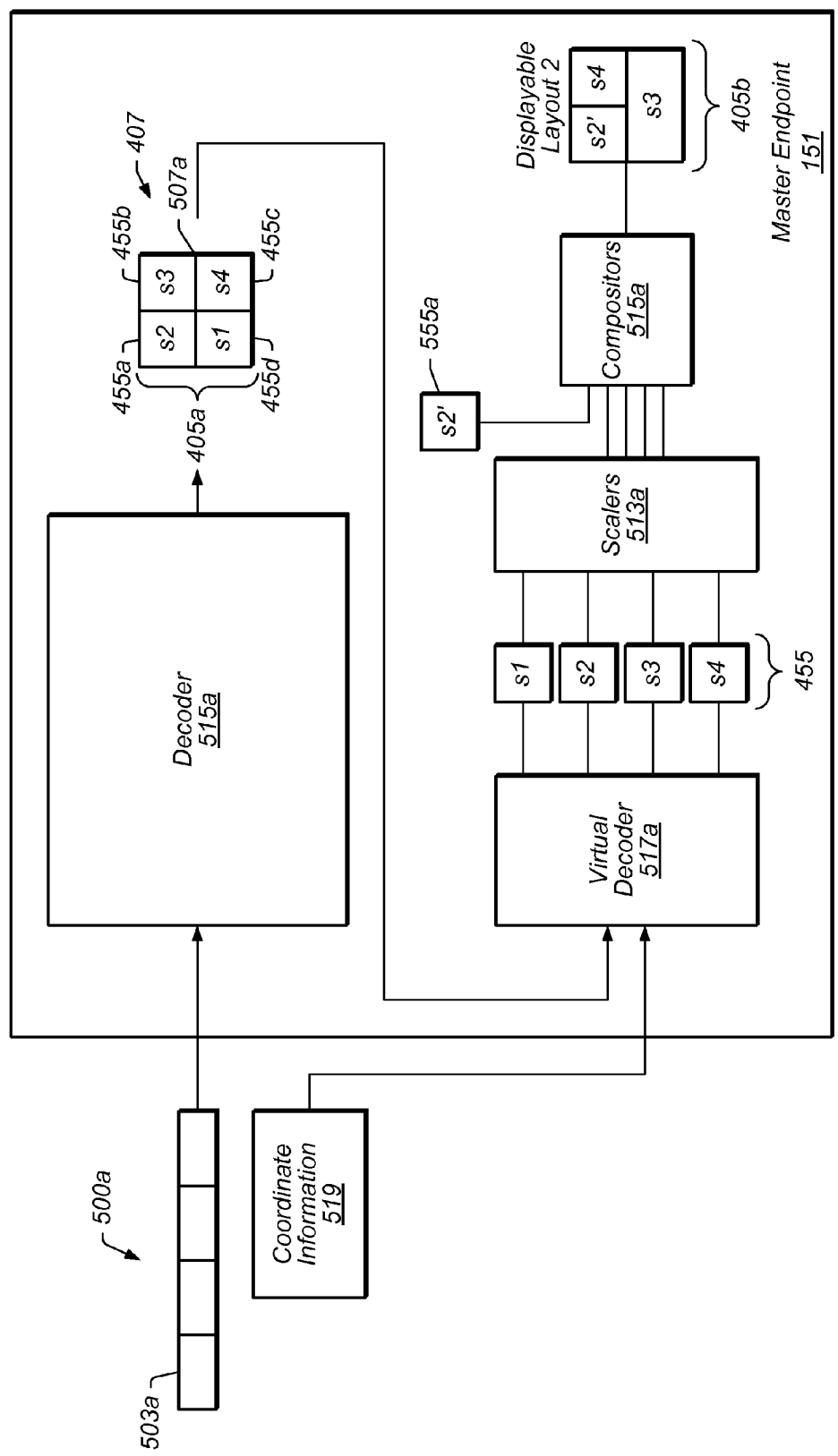
FIGS. 5a-b illustrate overall views of the re-compositing process including a virtual decoder, according to an embodiment.

While three video images 455 are shown with respect to video frame 507a, it is noted that video frame 507a may include other combinations of two or more video images 455 and video images 455 may be in a different layout than shown in FIG. 5a. For example, video frame 507a may include two video images (e.g., each 640 by 360 pixels) arranged side by side in a 1280 by 360 pixel video frame. Video frame 507a may then be separated into two 640 by 360 pixel video images. Other video image/video frame configurations are also contemplated.

In some embodiments, separating video images 455 may include, for example, storing separated video images 455 in separate locations of a memory. In some embodiments, separating video images 455 may include storing start and/or stop locations of separated video images 455 in a memory. Other means for separating video images 455 are also contemplated.

In some embodiments, virtual decoder 517a may be implemented as a software abstraction on hardware such as a field programmable gate-array (FPGA) or other processor. In some embodiments, one or more virtual decoders 517a may be implemented on a single ASIC (Application Specific Integrated Chip). Other virtual decoder configurations are also contemplated. In some embodiments, a separate processor may implement virtual decoder 517a by issuing commands to reprogram at least one FPGA to implement virtual decoder 517a. Other configurations are also contemplated.

At 313, master endpoint 151 may generate a composite video image (e.g., composite video image 405b) including two or more video images 455 (e.g., from leaf endpoints 155). In some embodiments, master endpoint 151 may have multiple scalers 513a and compositors 515a to scale received video images 455 and composite two or more of video images 455 from leaf endpoints 155 into, for example, a new composite layout 405b. In some embodiments, the video images in the new composite layout 405b may originate from leaf endpoints 155 communicating directly with the master endpoint 151 or communicating with the master endpoint 151 through a facilitator endpoint 153. In some embodiments, the video images composited into new composite layout 405b may be provided by separate facilitator endpoints (each communicating with different leaf endpoints 155). For example, the respective composite video images from two or more facilitator endpoints 153 may be separated and selected video images from these composite video images may be composited into the new composite video layout 405b by the master endpoint 151.

In some embodiments, master endpoint 151 may composite video images 455 into one or more respective video image layouts (e.g., as requested by respective leaf endpoints 155). For example, master endpoint 151 may composite two or more of received video images 455 into composite video image 405b (which may include video images 455 separated from the video frame 507a, scaled by scalers 513a and composited by compositors 515a). In some embodiments, the new composite video image 405b may include a local image 555a (e.g., from a camera local to master endpoint 151). In some embodiments, master endpoint 151 may form multiple composite video image layouts according to respective received video image layout preferences. In some embodiments, one composite video image layout may be formed for all of the conference participants.

Figure 6:
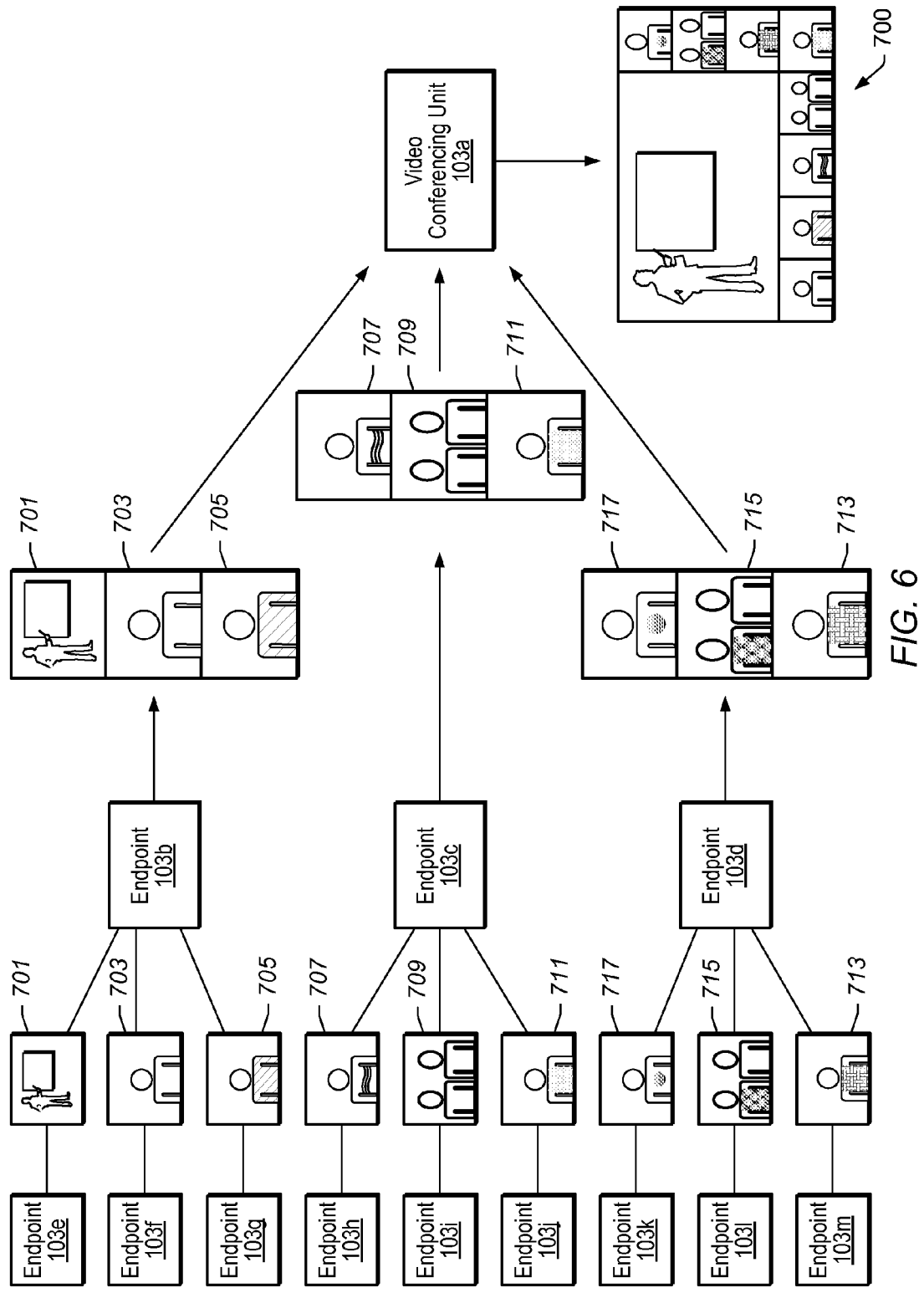
FIG. 6 illustrates a video image flow, according to an embodiment.
Figure 7:
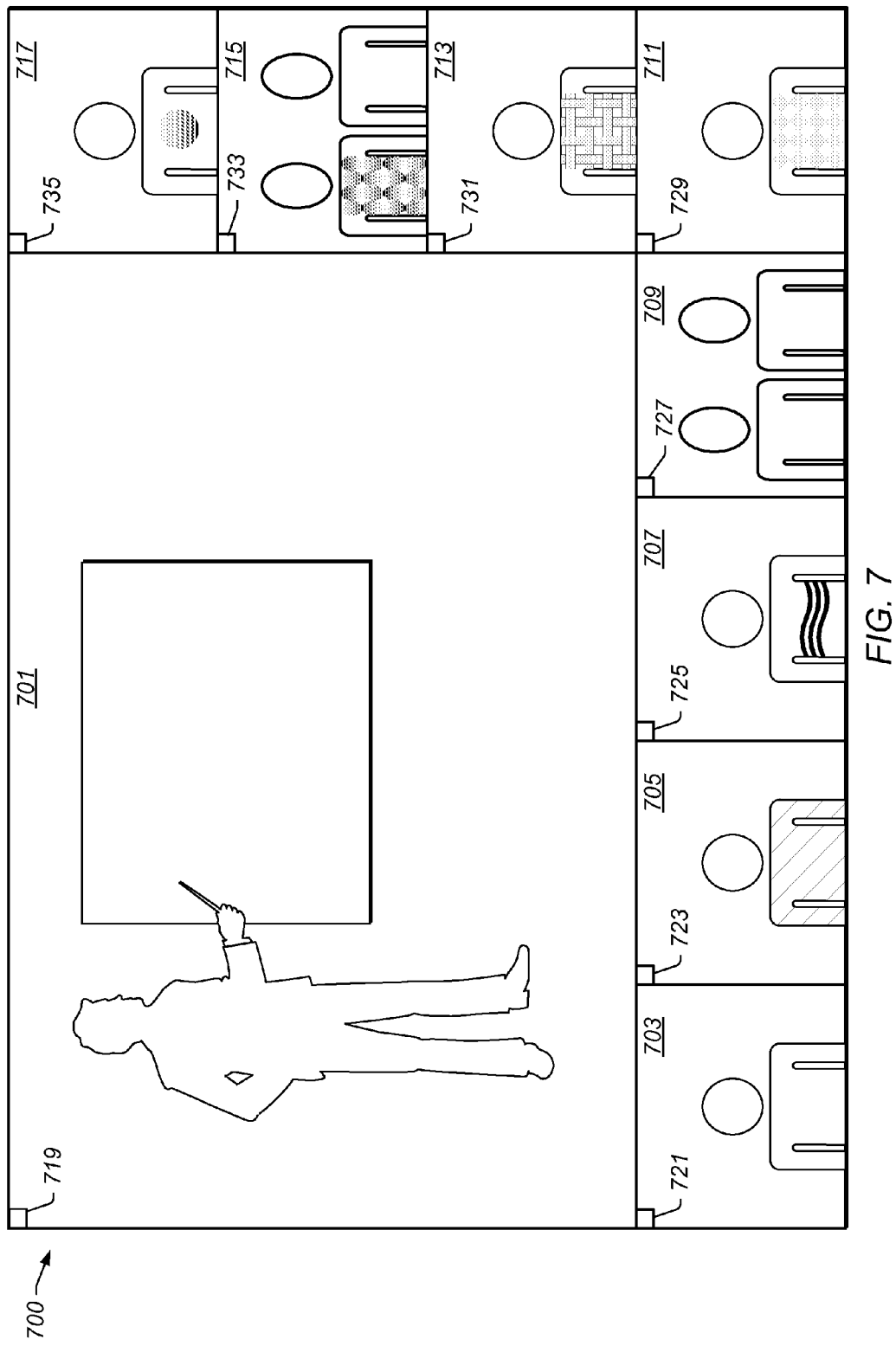
FIG. 7 illustrates a video image layout, according to an embodiment.

As seen in FIGS. 6 and 7, example composite layouts 700 may include nine video images 701, 703, 705, 707, 709, 711, 713, 715, and 717 originating from respective endpoints 103e-m (e.g., video image 701 from endpoint 103e, video image 703 from endpoint 103f, etc). Composite layout 700 may include main video image 701 of the endpoint with the current speaker and one or more side video images (e.g., side video images 703-717) of other endpoints participating in the videoconference.

At 315, master endpoint 151 may transmit composite video image layout 405b and coordinate information 519 to one or more leaf endpoints 155. In some embodiments, master endpoint 151 may transmit composite video image layout 405b to each leaf endpoint directly (e.g., through network 101). In some embodiments, master endpoint 151 may transmit composite video image layout 405b to leaf endpoints 155 through respective facilitator endpoints 153.

Figure 5B:
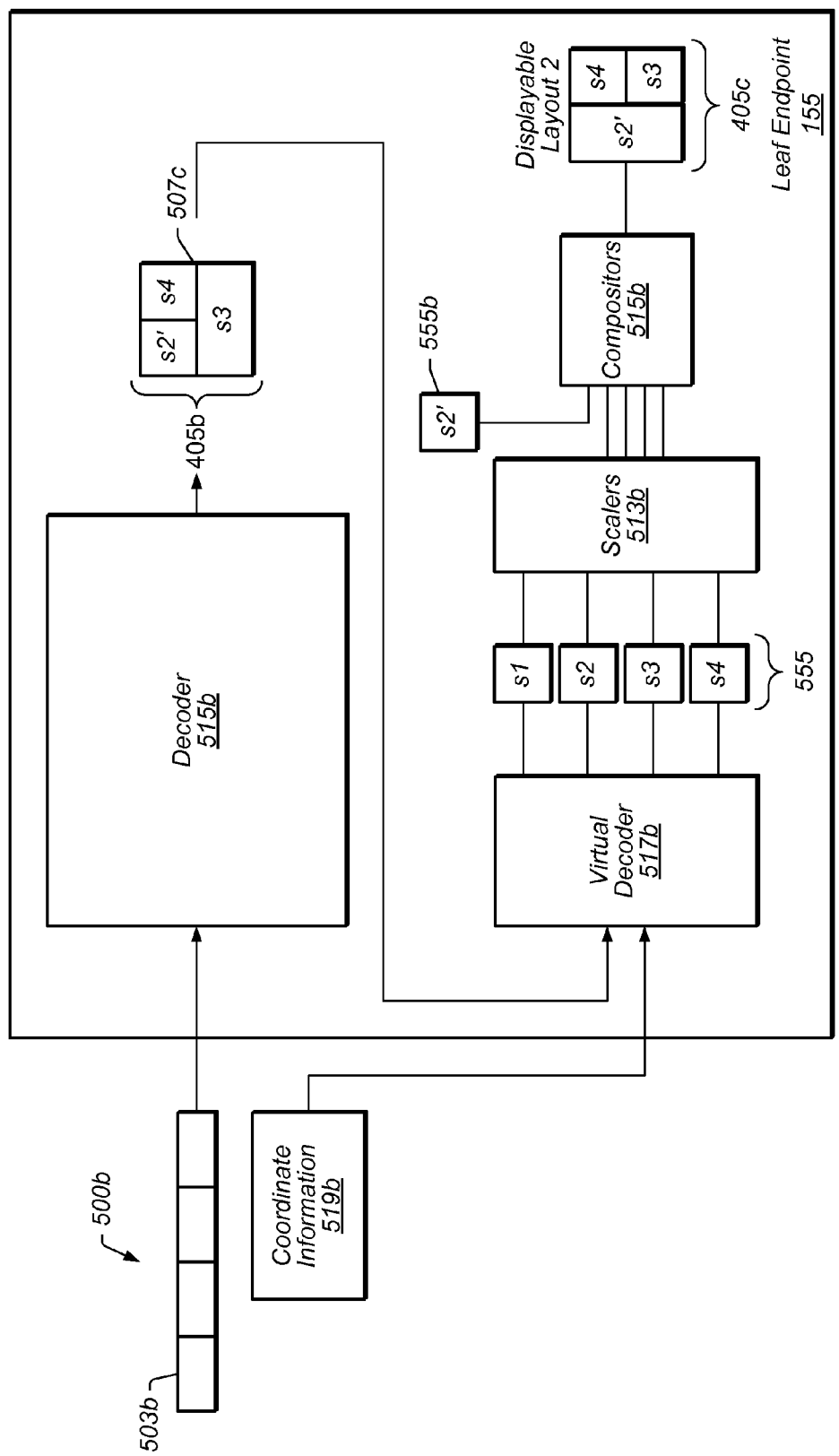
Figure 8A:
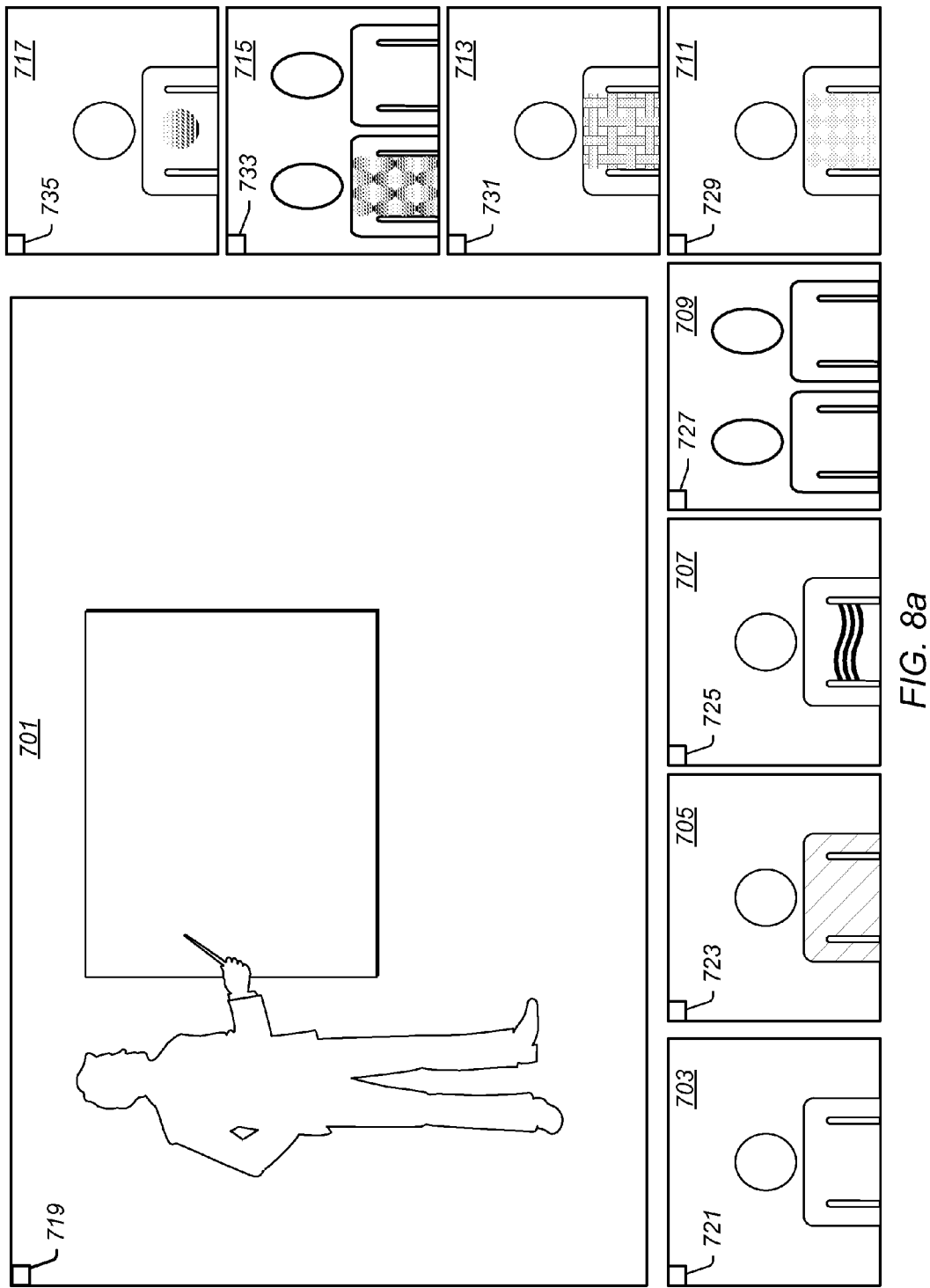
FIGS. 8a-b illustrate separated video images for arrangement in a new video layout, according to an embodiment.

At 317, leaf endpoint 155 may separate out video images 455 of composite video image 405b and form different composite video image layout 405c to display (e.g., see FIG. 5b). For example, leaf endpoint 155 may generate new composite video image layout 405c based, for example, on user preference. As seen in FIG. 8a, coordinate information 519 for coordinates 719-735 may be sent with the composite layout video frame and used by virtual decoder 517b (e.g., at leaf endpoint 155) to separate video images 455 into separated video images. In some embodiments, one or more of the separated video images may be provided to one or more scalers 513b. The video images (including scaled video images, if any) may then be provided to one or more compositors 515b. One or more compositors 515b may composite video images 555 into video image layout 405c requested by a local participant through leaf endpoint 155. In some embodiments, local participant may cycle through the layout offerings from leaf endpoint 155 (e.g., by clicking an icon to cycle to the next available layout). In some embodiments, scalers 513b and compositors 515b may be implemented in hardware or software. In some embodiments, icon scalers may be used (e.g., if all of the endpoint's other scalers are being used).

In some embodiments, if main video image 701 and two side video images 707 and 709 are placed in video image layout 800 (see FIG. 8b) with equal sized video images, main video image 701 may be scaled down and the two side video images 703 and 705 may be scaled up (or not scaled at all). Other scaling combinations are also contemplated. In some embodiments, the separated video images may not be scaled (e.g., the separated video images may be only rearranged). In some embodiments, scaling may include changing the ratio of the outer dimensions of an image.

In some embodiments, leaf endpoint 155 may form a new video image layout 405c that includes its current local video image 555b as one of the video images. In some embodiments, the layout of the received video image layout and the new video image layout may be the same. In some embodiments, current local video image 555b may be more current than the local video originally sent to facilitator endpoint 153 and received in composite video image layout 405b. In some embodiments, only one of the video images may be separated out of composite video image layout 405b. For example, the video image corresponding to the local video image may be separated and the current local video image 555b may be placed into composite video image layout 405c in place of the previous local video image 555a.

Figure 8B:
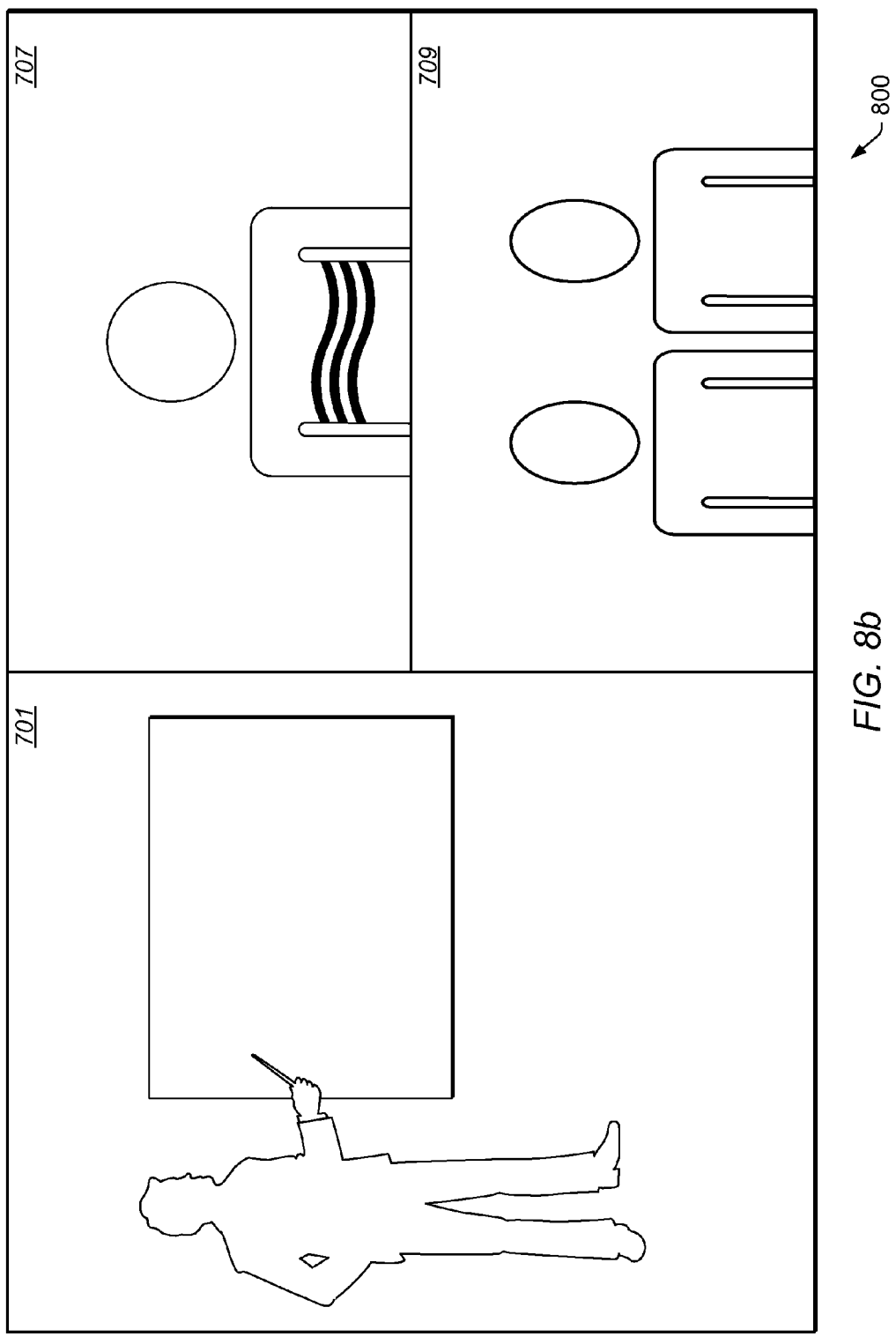

At 319, leaf endpoint 155 may display new composite video image layout 405c and/or composite video image layout 405b from master endpoint 151. FIG. 8b illustrates an example of new video image layout 800 with three video images 701, 707, and 709 on display. FIG. 10 illustrates other possible video image layouts, according to various embodiments. Other video image layouts are also contemplated. In some embodiments, metadata 901 may be displayed (e.g., with each respective video image in the video image layout).

Figure 11:
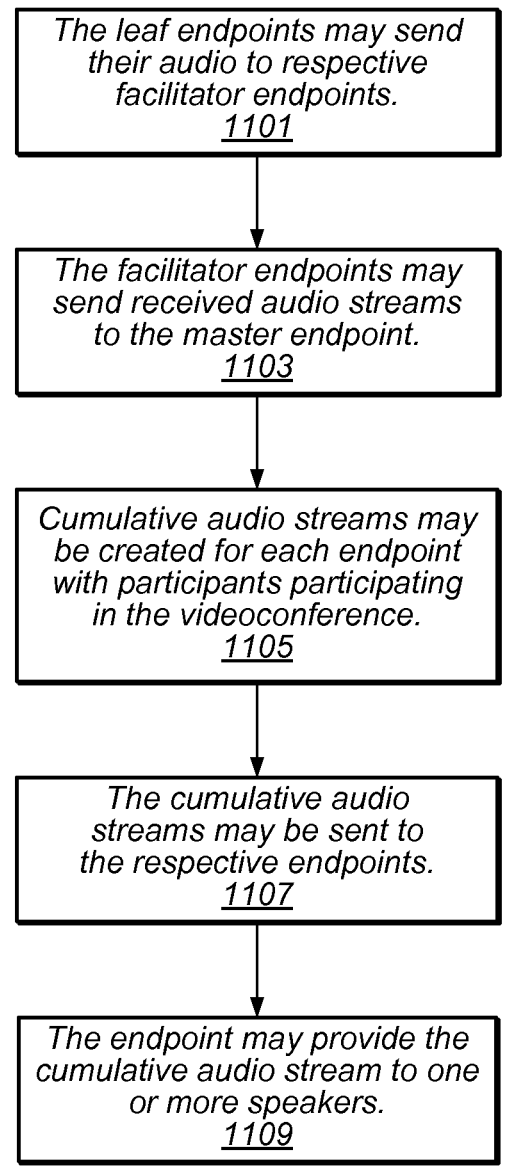
FIG. 11 illustrates a flowchart of a method for audio management in a distributed virtual multipoint control unit, according to an embodiment.

FIG. 11 illustrates a flowchart of a method for audio management in a distributed virtual multipoint control unit, according to an embodiment. It should be noted that in various embodiments of the methods described below, one or more of the elements described may be performed concurrently, in a different order than shown, or may be omitted entirely. Other additional elements may also be performed as desired.

Figure 15A:
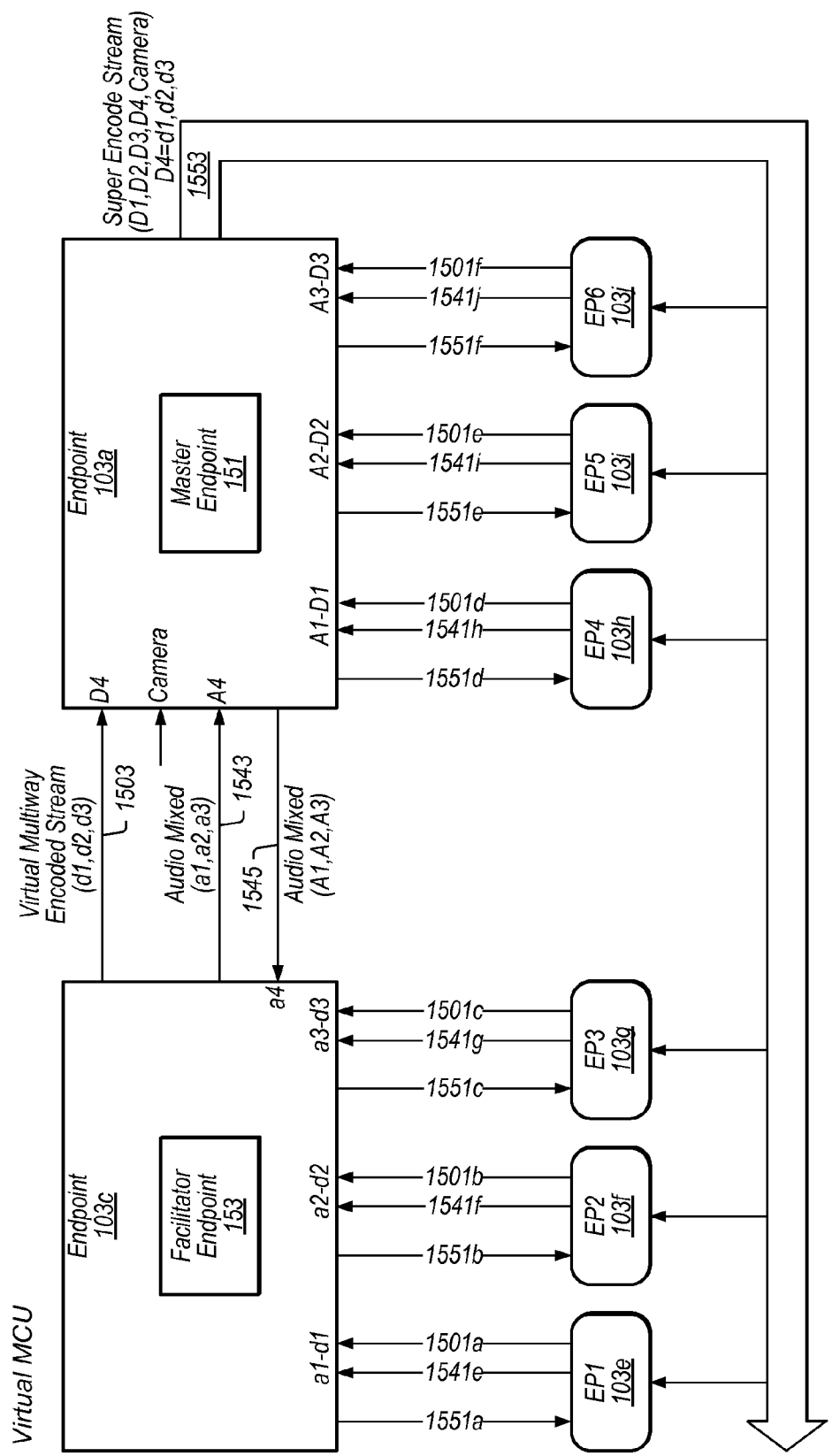
FIGS. 15a-b illustrates video and audio signals between master endpoints, facilitator endpoints, and leaf endpoints, according to an embodiment.

At 1101, leaf endpoints 155 (e.g., endpoints 103e-j in FIG. 15a) may send respective audio streams (e.g., 1541e-g) to respective facilitator endpoints 153 (e.g., endpoint 103c). Audio from microphones at leaf endpoint 155 may be encoded and sent in respective audio streams to respective facilitator endpoints 153 for leaf endpoints 155. Audio streams may also be sent to master endpoint 151 (e.g., endpoint 103a) from leaf endpoints 155 (e.g., endpoints 103h-j). In some embodiments, respective video streams 1501a-f may also be sent to facilitator endpoint 153 and/or master endpoint 151. Video streams 1501a-f may be sent in raw format from leaf endpoint 155 to facilitator endpoint 153, master endpoint 151, and/or between facilitator endpoint 153 and master endpoint 151. While a raw format may decrease latency in video display of the product video stream from master endpoint 151, the raw format may require a higher bit rate.

At 1103, facilitator endpoints 153 may send received audio streams (e.g., in a mixed audio stream 1543 including a combination of the received audio stream (e.g., audio streams 1541e-g) or may send the separate streams 1541e-g) to master endpoint 151. Facilitator endpoint 153 may decode the audio received from leaf endpoints 155 prior to sending the audio to master endpoint 151. Facilitator endpoint 153 may combine the audio streams and encode the combined audio stream before sending the combined audio stream to master endpoint 151. In some embodiments, the audio streams sent to master endpoint 151 may be labeled with information about source leaf endpoint 155. In some embodiments, facilitator endpoint 153 may further send cumulative video stream 1503 to master endpoint 151. In some embodiments, cumulative video stream 1503 may include a composite video image in one video stream that includes the video images from endpoints 103e-g. In some embodiments, cumulative video stream may include multiple video streams from endpoints 103e-g.

At 1105, cumulative audio streams (e.g., audio streams 1551a-f (referred generally as "cumulative audio stream 1551")) may be created for each participating endpoint 103 in the videoconference (e.g., leaf endpoints 155, facilitator endpoints 153, and/or master endpoint 151). Each respective cumulative audio stream 1551 may include the audio from one or more of the other endpoints 103 participating in the videoconference call and may not include the audio of recipient endpoint 103. In some embodiments, master endpoint 151 may create each cumulative audio stream 1551 for each respective endpoint (e.g., endpoints 103e-j). In some embodiments, master endpoint 151 may send the received audio streams to each facilitator endpoint 153 and facilitator endpoints 153 may create cumulative audio streams 1551 for their respective leaf endpoints 155. Other audio stream arrangements are also contemplated.

At 1107, cumulative audio streams 1551 may be sent to respective endpoints 103. In some embodiments, master endpoint 151 may send cumulative audio stream 1551 to respective leaf endpoint 155. In some embodiments, facilitator endpoint 153 may send cumulative audio stream 1551 to respective leaf endpoint 155. In some embodiments, master endpoint 151 may send a composite video stream (e.g., that includes video images of multiple endpoints 103) to endpoints 103e-j (e.g., composite video stream 1553). In some embodiments, master endpoint 151 may send multiple video streams to endpoints 103.

At 1109, endpoint 103 may provide cumulative audio stream 1551 to one or more speakers for reproduction.

Figure 12:
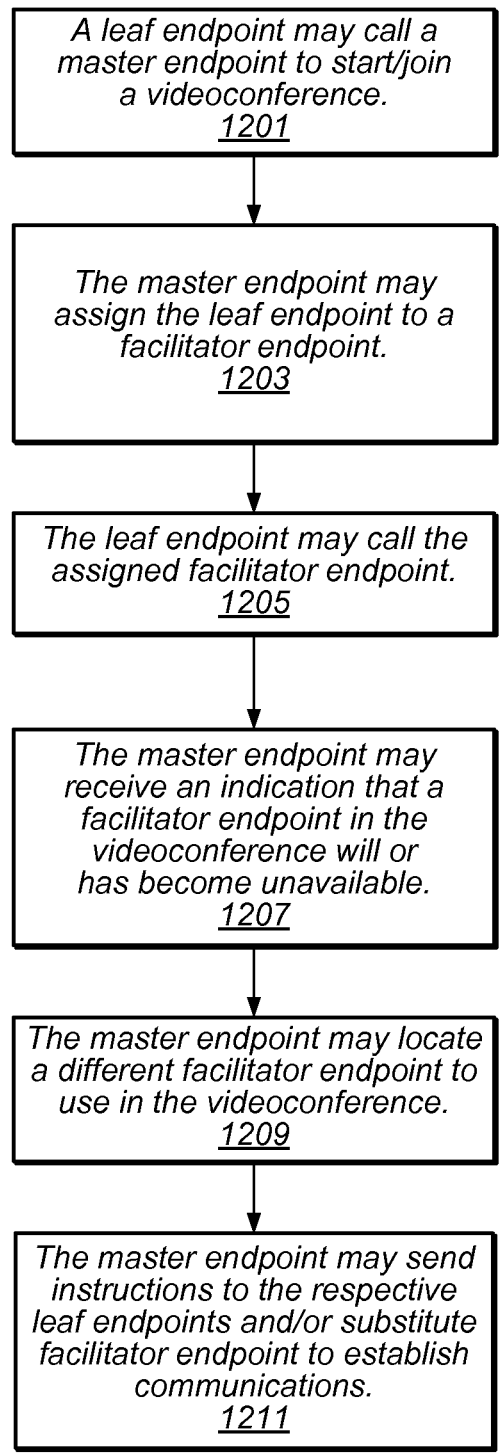
FIG. 12 illustrates a flowchart of a method for controlling a distributed virtual multipoint control unit, according to an embodiment.

FIG. 12 illustrates a flowchart of a method for controlling a distributed virtual multipoint control unit, according to an embodiment. It should be noted that in various embodiments of the methods described below, one or more of the elements described may be performed concurrently, in a different order than shown, or may be omitted entirely. Other additional elements may also be performed as desired.

At 1201, leaf endpoint 155 may call master endpoint 151 to start/join a videoconference.

At 1203, master endpoint 151 may assign leaf endpoint 155 to facilitator endpoint 153 based on at least one operable characteristic of facilitator endpoint 153 and/or leaf endpoint 155. For example, master endpoint 151 may dynamically select a facilitator endpoint 153 within a network (e.g., a LAN or WAN) based on a network characteristic (e.g., IP round trip time). As another example, the at least one operable characteristic may indicate a likelihood of facilitator endpoint 153 being in use at a time of a current videoconference call. Master endpoint 151 may monitor facilitator endpoints 153 (e.g., on a daily basis) and may determine usage patterns for multiple facilitator endpoints 153. For example, master endpoint 151 may discover that a particular facilitator endpoint 153 is not used often during the afternoon. Master endpoint 151 may then store an indicator noting that master endpoint 151 may be able to use particular facilitator endpoint 153 in an afternoon videoconference call. In some embodiments, master endpoint 151 may also check the status of facilitator endpoint 153 (e.g., by determining if facilitator endpoint 153 is currently in a videoconference call) prior to assigning leaf endpoint 155 to facilitator endpoint 153. In some embodiments, part of assigning leaf endpoint 155 to facilitator endpoint 153 may include sending an identification of respective facilitator endpoint 153 and/or an access number/IP address for facilitator endpoint 153 to leaf endpoint 155.

At 1205, leaf endpoint 155 may call the assigned facilitator endpoint 153.

At 1207, master endpoint 151 may receive an indication that facilitator endpoint 153 in the videoconference will or has become unavailable. For example, master endpoint 151 may note a different videoconference call that is scheduled to take place using facilitator endpoint 153. In some embodiments, an individual (not in the current videoconference) may attempt to start using facilitator endpoint 153 to start a different videoconference (e.g., by accessing a menu on facilitator endpoint 153 to start a dialing process). In some embodiments, facilitator endpoint 153 may send the indication (e.g., a digital message) to master endpoint 151 indicating the interruption.

At 1209, master endpoint 151 may locate different facilitator endpoint 153 to use in the videoconference. For example, master endpoint 151 may analyze operable characteristics of other facilitator endpoints 153 to locate substitute facilitator endpoint 153. In some embodiments, if substitute facilitator endpoint 153 cannot be located, the participants in the videoconference (all or a subset) may be notified of the problem. In some embodiments, leaf endpoint 155 that is about to be interrupted may display a message regarding the current videoconference and the individual about to start a new videoconference may hold off until the current videoconference is concluded. In some embodiments (e.g., during high priority videoconferences) facilitator endpoints 153 may not allow an individual to use facilitator endpoint 153 until the current videoconference has concluded.

At 1211, master endpoint 151 may send instructions to respective leaf endpoints 155 and/or substitute facilitator endpoint 153 to establish communications. For example, leaf endpoints 155 may hang up with current facilitator endpoint 153 and call substitute facilitator endpoint 153. In some embodiments, substitute facilitator endpoint 153 may initiate the call with respective leaf endpoints 155. In some embodiments, the new communication link may be established with little interruption to the videoconference. For example, during the call initiation, the current video frame may be frozen on the screen until a new video image is received when the new communication link is established. In some embodiments, the participants at respective leaf endpoints 155 may or may not be notified of the facilitator endpoint switch.

Figure 13:
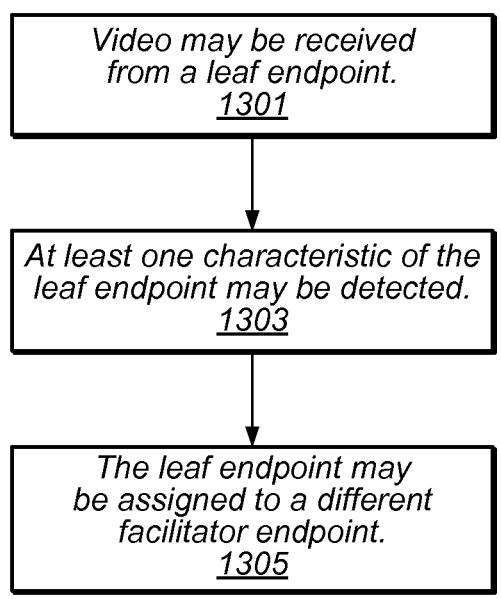
FIG. 13 illustrates a flowchart of a method for isolating a leaf endpoint in a distributed virtual multipoint control unit, according to an embodiment.
Figure 14:
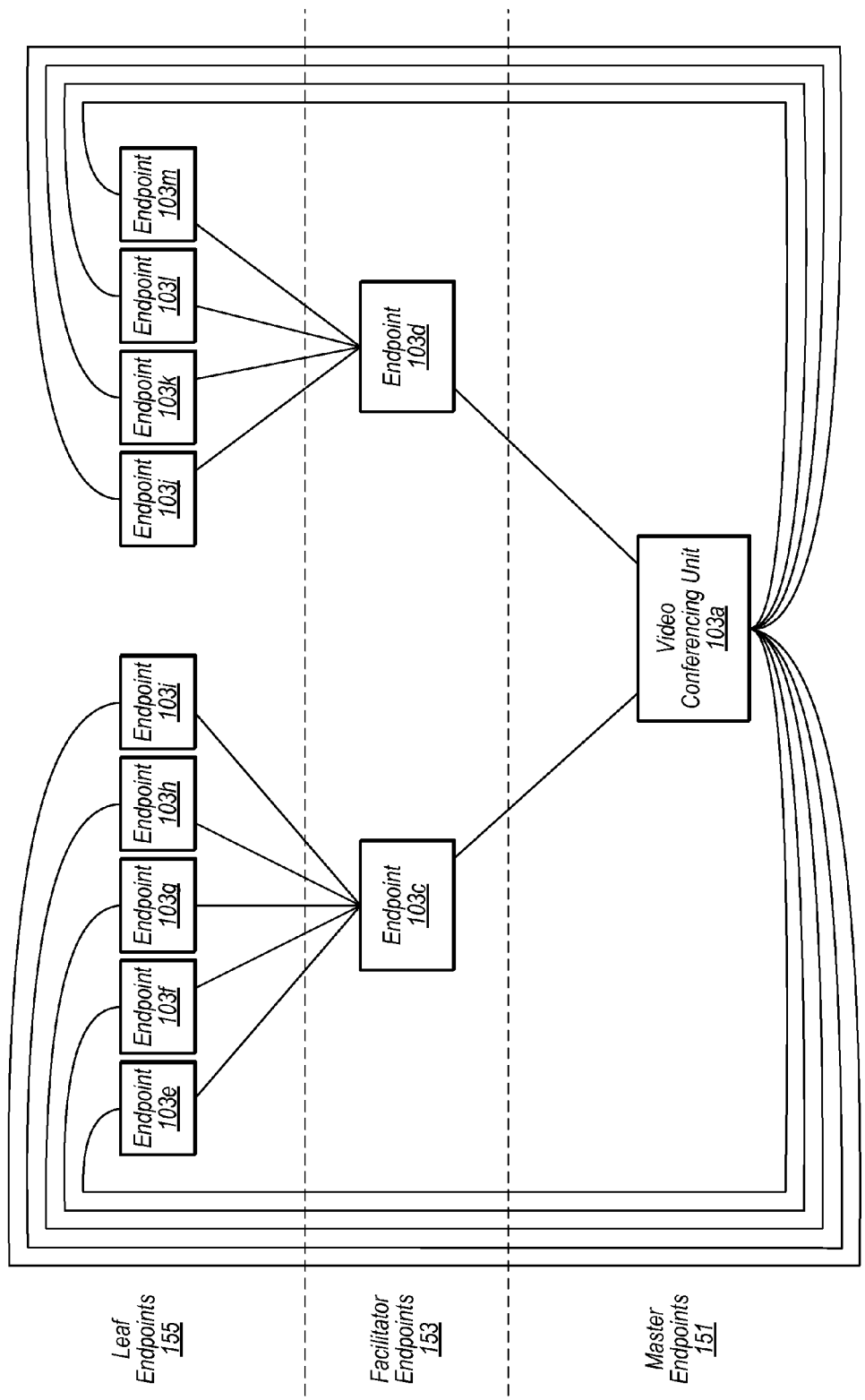
FIG. 14 illustrates communication paths between master endpoints, facilitator endpoint, and leaf endpoints, according to an embodiment.

FIG. 13 illustrates a flowchart of a method for isolating leaf endpoint 155 in a distributed virtual multipoint control unit, according to an embodiment. It should be noted that in various embodiments of the methods described below, one or more of the elements described may be performed concurrently, in a different order than shown, or may be omitted entirely. Other additional elements may also be performed as desired.

At 1301, video may be received from leaf endpoint 155. In some embodiments, video may be received from leaf endpoint 155 through facilitator endpoint 153.

At 1303, at least one characteristic of leaf endpoint 155 may be detected (e.g., by facilitator endpoint 153 and/or master endpoint 151). In some embodiments, master endpoint 151 may assign leaf endpoint 155 to specific facilitator endpoint 153 based on the detected at least one characteristic. For example, the detected characteristic may include a low display and/or camera resolution (e.g., as compared to the other leaf endpoints 155). In some embodiments, the detected characteristic may include a high error rate (e.g., as compared to the other leaf endpoints 155). In some embodiments, the detected characteristic may indicate that leaf endpoint 155 is a host endpoint and/or include a main presenter for the videoconference.

At 1305, leaf endpoint 155 may be assigned to different facilitator endpoint 153 (e.g., facilitator endpoint 153 dedicated to leaf endpoint 155). In some embodiments, the process described above in elements 1209-1211 may be used to reassign leaf endpoint 155. Assigning specific leaf endpoint 155 to particular facilitator endpoint 153 may improve the interaction between other leaf endpoints 155 and previous facilitator endpoint 153. For example, facilitator endpoint 153 may be able to use a higher resolution when sending/receiving video images to/from other leaf endpoints 155. In addition, facilitator endpoint 153 may have additional processing power (e.g., processing power that was previous tied up dealing with specific leaf endpoint 155) to manage other leaf endpoints 155. In some embodiments, specific leaf endpoint 155 that is reassigned may have a lower resolution, less processing power, etc. than other leaf endpoints 155 in the videoconference. Facilitator endpoint 153 assigned to specific leaf endpoint 155 may be able to handle additional intercode frame requests from the specific endpoint and/or make other accommodations for the specific endpoint. For example, master endpoint 151 may send a composite video image to facilitator endpoint 153 and facilitator endpoint 153 may send a composite video image to specific leaf endpoint 155 (which may make repeated requests for intercede frame requests from facilitator endpoint 153, for example, because of data loss). In some embodiments, the audio only leaf endpoints may be assigned to separate facilitator endpoint 153. In some embodiments, reassigning leaf endpoint 155 may provide additional processing resources to provide a better connection to a priority endpoint (e.g., the host and/or a presenter). Facilitator endpoint 153 may reduce latency to the priority endpoint.

Figure 17:
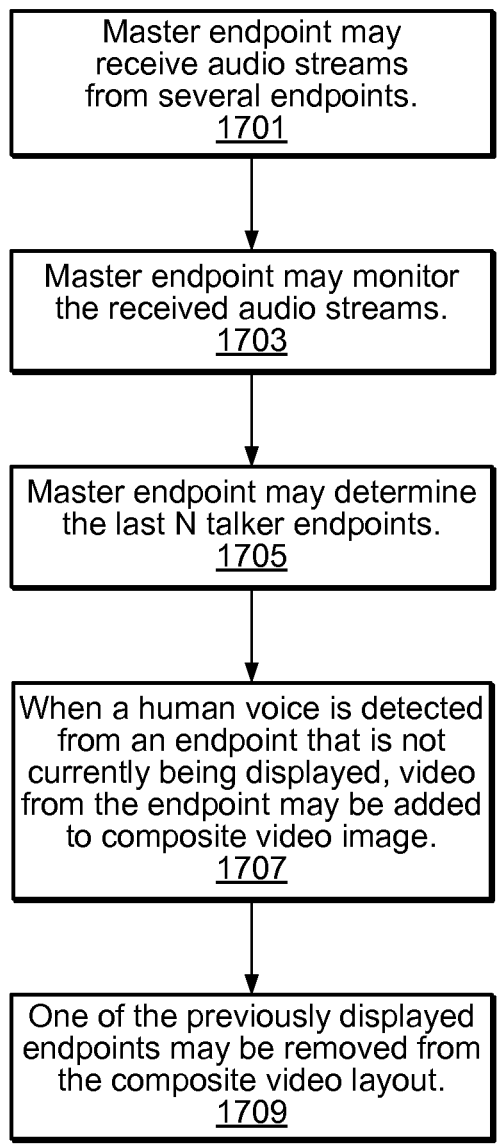
FIG. 17 illustrates a flowchart of a method for displaying last N talkers, according to an embodiment.

FIG. 17 illustrates a flowchart of a method for displaying last N talkers in a virtual distributed multipoint control unit, according to an embodiment. It should be noted that in various embodiments of the methods described below, one or more of the elements described may be performed concurrently, in a different order than shown, or may be omitted entirely. Other additional elements may also be performed as desired.

At 1701, master endpoint 151 may receive audio streams 1541 from several endpoints 103 in a videoconference. In some embodiments, master endpoint 151 may receive audio streams 1541 from leaf endpoints 155 communicating with facilitator endpoint 153.

At 1703, master endpoint 151 (or facilitator endpoint 153) may monitor received audio streams 1541. Master endpoint 151 may monitor the audio in audio streams 1541 to determine which audio streams 1541 may include human voices. For example, human voices in audio streams 1541 may be represented by a particular audio pattern (e.g., amplitude over time) and/or frequencies recognizable by audio processing algorithms (e.g., implemented on processors of master endpoint 1541 or other endpoints 103). For example, detected audio energy in a frequency range associated with human voices may be associated with a human voice. In some embodiments, master endpoint 151 may look to an amount of energy in respective audio signal 1541 to determine which audio signals 1541 may include a human voice. For example, energy levels in audio signal 1541 may be averaged over time and detected levels above the averaged energy level may be associated with a human voice. In some embodiments, a threshold may be predetermined or set by a user (e.g., the threshold may be an amplitude level in decibels of average human voices (e.g., 60-85 decibels) in a conference environment). Other thresholds are also contemplated. In some embodiments, facilitator endpoints 153 and/or leaf endpoints 155 may monitor audio streams 1541 for human voices. Facilitator endpoints 153 and/or leaf endpoints 155 may signal master endpoint 151 when a voice is detected.

At 1705, master endpoint 151 (or facilitator endpoint 153) may determine which endpoints 103 include the last N talkers. Methods for determining the last N talkers may be found, for example, in U.S. patent application titled "Systems and Methods for Selecting Videoconferencing Endpoints for Display in a Composite Video Image", Ser. No. 12/244,436 which was filed Oct. 2, 2008, whose inventors are Ashish Goyal, Hrishikesh Gopal Kulkarni, and Shantha Kumari Harohalli Sathyanarayana Rao which is hereby incorporated by reference in its entirety as though fully and completely set forth herein. N may include a default number and/or may be set by a user. For example, a host at master endpoint 151 may specify composite video image 407 should include 4 total endpoints 103 (N=4). In this example, last four endpoints 103 with detected human voices (or, for example, audio above a threshold) may be displayed in a composite video image provided to endpoints 103 by master endpoint 151. N may also be dynamic (e.g., N may dynamically adjust to be a percentage of the total number of endpoints 103 participating in the videoconference).

In some embodiments, when master endpoint 151, facilitator endpoint 153, or leaf endpoint 155 determines that audio stream 1541 has a human voice (or is above a threshold, etc), endpoint 103 associated with audio stream 701 may be associated with a current talker in the videoconference. Other methods of determining which audio streams 1541 have a talker may be found in U.S. patent application titled "Controlling Video Display Mode in a Video Conferencing System", Ser. No. 11/348,217, which was filed Feb. 6, 2006, whose inventor is Michael L. Kenoyer which is hereby incorporated by reference in its entirety as though fully and completely set forth herein. In some embodiments, audio stream 1541 may be considered to include a participant talking in the videoconference when the audio signal strength exceeds a threshold (e.g., a default or user provided threshold) for energy and/or time (e.g., is louder than a given threshold for at least a minimum amount of time such as 2-5 seconds). Other time thresholds are also possible (e.g., 10 seconds, 20 seconds, etc). In some embodiments, a user may indicate when they are speaking by providing user input (e.g., by pressing a key on a keyboard coupled to the user's endpoint 103). Other talker determinations are also contemplated.

In some embodiments, master endpoint 151 may use timers or a queue system to determine the last N talkers (other methods of determining the last N talkers may also be used). For example, when a human voice is detected in audio stream 1541 of endpoint 103, a video image (e.g., see video images 455b-h) of video stream 1501 (e.g., see video streams 1501a-f) for endpoint 103 may be displayed in a composite video stream and a timer for endpoint 103 may be started (or restarted if endpoint 103 currently being displayed is a last N talker). The N endpoints 103 with timers indicating the shortest times (corresponding, therefore, to the most recent talkers) may have their corresponding video image displayed in a composite video image. In some embodiments, a time stamp may be noted for endpoint 103 when a talker is detected and the time to the last time stamp for endpoints 103 may be used to determine the most recent talkers. Other timing methods may also be used. In some embodiments, an indicator for endpoint 103 with audio stream 701 associated with a human voice may be moved to the top of a list and endpoints 103 previously listed may be lowered on the list by one spot. When a talker is detected in audio stream 701, an indicator for corresponding endpoint 103 may be moved to the top of the list (or may remain at the top of the list if it is also the last detected talker). The top N indicated endpoints 103 may be displayed in a composite video image. Other methods of tracking the current N talker endpoints 103 may also be used. For example, other tracking methods besides a list may be used.

In some embodiments, master endpoint 151 (or, for example, facilitator endpoint 153) may further determine of the last N talkers which talker is the dominant talker. For example, master endpoint 151 may consider the most recent talker the dominant talker, may consider the talker who has been detected speaking longest over a period of time the dominant talker, or may consider the talker who has the most energy detected in their audio signal to be the dominant talker. Other methods of determining the dominant talker are also contemplated. In some embodiments, the dominant talker may be displayed in a larger pane of the composite video image than the other displayed video images.

Figure 15B:
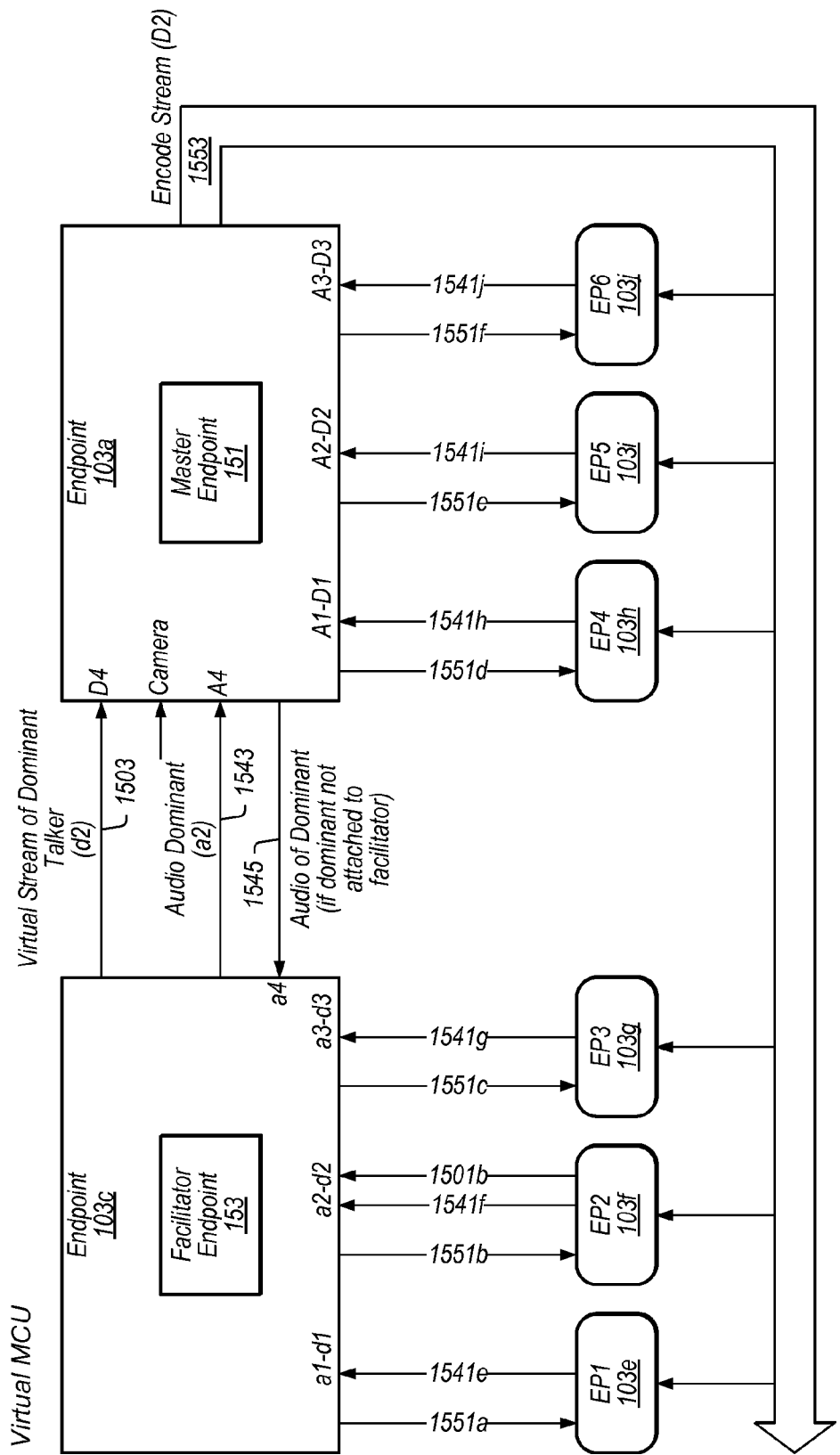

In some embodiments, endpoints 103 that are not being displayed may be instructed by master endpoint 151 or facilitator endpoint 153 not to send their video streams 1501 to respective master endpoint 151 or facilitator endpoint 153. For example, as seen in FIG. 15*b*, endpoints 103*e*, 103*g*, 103*h*, 103*i*, and 103*j* may discontinue sending video stream 1501 while endpoint 103*f* may send video stream 1501*b* to facilitator endpoint 153 which may send a video stream 1503 to master endpoint 151 (facilitator endpoint 153 may also send the audio stream 1541 from endpoint 103*f* to the master endpoint 151 in stream 1543). In some embodiments, multiple endpoints 103 may send their video to be composited while one or more other endpoints 103 are not sending their video. In some embodiments, master endpoint 151 and/or facilitator endpoint 153 may ignore (e.g., not decode) video streams 1501 sent by endpoints 103 that are not currently being displayed. The master endpoint 151 may send a video stream 1553 with the video of a dominant talker endpoint (or, for example, a designated presenter endpoint, control endpoint, etc.) to the endpoints 103 (the audio of the dominant talker endpoint may also be sent to the endpoints 103). In some embodiments, if the dominant talker endpoint is communicating directly with the master endpoint 151, the master endpoint 151 may send the audio of the dominant talker endpoint to the facilitator endpoint 153 to be distributed to the endpoints 103 communicating directly with the facilitator endpoint 153. In some embodiments, master endpoint 151 and facilitator endpoint 153 may make detect one or more actively talking endpoints and the master endpoint 151 may compile two or more of the actively talking endpoints into a composite image to send to the endpoints 103.

At 1707, when a human voice is detected in audio stream 1541 that corresponds to endpoint 103 that is not currently being displayed in a composite video image, master endpoint 151 may add video from the corresponding endpoint to the composite video image. In some embodiments, the corresponding endpoint's video may no longer be ignored by the compositing master endpoint 151 or master endpoint 151 may send a message to the corresponding endpoint requesting the endpoint start sending endpoint's video stream 1501 to master endpoint 151. In some embodiments, the most current detected talker endpoint may be displayed in a specific place in a composite video image (e.g., in a larger pane than other displayed endpoints 103). For example, if endpoint 103*b* has the most current detected talker endpoint 103, video image 455*b* from endpoint 103*b* may be displayed in the large pane of the composite video image sent to endpoints 103.

In some embodiments, voice detection may occur locally at leaf endpoints 155. For example, leaf endpoints 155 may be instructed (e.g., by master endpoint 151) to start sending their respective video stream 1501 (and/or audio stream 1541) when endpoint 103 detects human voices (or, for example, audio over a certain level) from the local audio source (e.g., local microphones). Master endpoint 151 (or facilitator endpoint) may then determine the last N talkers based on when master endpoint 151 (or facilitator endpoint 153) receives video streams 703 (and/or audio stream 701) from various endpoints 103. In some embodiments, master endpoint 151 may send instructions to endpoint 103 to stop sending its video stream 1501 (and/or audio stream 701) if human voices are no longer detected in audio stream 1501 of respective endpoint 103 and video stream 1501 is being received from a different endpoint 103. Other management schemes for determining the last N talkers are also contemplated.

In some embodiments, statistics and other information may also be displayed in video images 455 of a composite video image. For example, participant location, codec type, user identifiers, etc. may be displayed in respective video images 455 of a composite video image. In some embodiments, the statistics may be provided for all endpoints 103 or only endpoints 103 being displayed in a composite video image. In some embodiments, the statistics may be sorted on the basis of talker dominance, codec type, or call type (e.g., audio/video).

At 1709, one of the previously displayed endpoints 103 may be removed from the composite video image (e.g., corresponding to endpoint 103 with the longest duration since the last detected human voice). In some embodiments, a video decoder previously being used to decode the previously displayed endpoint 103 may be reassigned to decode video stream 1501 from the most current N-talker endpoint 103 (e.g., just added to the composite video image).

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for conducting a videoconference having a plurality of endpoints, comprising:
   a facilitator endpoint in the videoconference receiving a video image from a first leaf endpoint in the videoconference;
   the facilitator endpoint sending the received video image to a master endpoint in the videoconference as part of a facilitator composite image;
   wherein the master endpoint is operable to form a new composite image using at least the received video image in the facilitator composite image and at least one video image from a second leaf endpoint; and
   the facilitator endpoint sending an indication to the master endpoint that the facilitator endpoint is about to be unavailable, wherein the master endpoint is operable to assign the first leaf endpoint to a different facilitator endpoint in response to the master endpoint receiving the indication.

2. The method of claim 1,
   wherein the facilitator endpoint is a first facilitator endpoint and wherein the master endpoint is further operable to receive a second facilitator composite image from a second facilitator endpoint;
   wherein the at least one video image from the second leaf endpoint is received by the master endpoint as part of the second facilitator composite image sent by the second facilitator endpoint.

3. The method of claim 1, wherein the at least one video image from the second leaf endpoint is received by the master endpoint directly from the second leaf endpoint.

4. The method of claim 1, wherein the at least one video image from the second leaf endpoint is also received by the master endpoint as part of the facilitator composite image sent by the facilitator endpoint.

5. The method of claim 1, wherein the master endpoint is operable to send the new composite video image to the first and second leaf endpoints.

6. The method of claim 1, wherein the master endpoint is operable to:
   receive composite video images from a plurality of facilitator endpoints;
   form the new composite video image using video images from at least two of the received composite video images; and
   send the new composite video image to one or more leaf endpoints communicating with the plurality of facilitator endpoints.

7. The method of claim 1, further comprising:
   the facilitator endpoint receiving audio from the first leaf endpoint; and
   the facilitator endpoint sending the received audio to the master endpoint.

8. The method of claim 7,
   wherein the received audio sent to the master endpoint comprises a first audio stream;
   wherein the master endpoint is further operable to send a second audio stream to the facilitator endpoint; and
   wherein the method further comprises:
      the facilitator endpoint forming a cumulative audio stream based on one or more of the first and second audio streams from the master endpoint; and
      the facilitator endpoint sending the cumulative audio stream to the first leaf endpoint.

9. The method of claim 7,
   wherein the received audio sent to the master endpoint comprises a first audio stream;
   wherein the master endpoint is further operable to receive a second audio stream from the second leaf endpoint;
   wherein the master endpoint is further operable to form a cumulative audio stream based on one or more of the first audio stream and the second audio stream; and
   wherein the master endpoint is further operable to send the cumulative audio stream to at least one of the first leaf endpoint and the second leaf endpoint.

10. The method of claim 1,
    wherein the master endpoint has a first number of input ports;
    wherein operation of the facilitator endpoint allows the master endpoint to support a videoconference having a number of facilitator endpoints and leaf endpoints greater than the first number.

11. The method of claim 1,
    wherein the master endpoint has a first number of video decoders;
    wherein operation of the facilitator endpoint allows the master endpoint to support a videoconference having a number of facilitator endpoints and leaf endpoints greater than the first number.

12. A method, comprising:
    a master endpoint receiving at least one composite video image from at least one facilitator endpoint, wherein the at least one composite video image comprises at least a video image from a first leaf endpoint;
    the master endpoint receiving a video image from a second leaf endpoint;
    the master endpoint compositing at least the video image from the first leaf endpoint and the video image from the second leaf endpoint into a new composite video image; and
    the master endpoint assigning the first leaf endpoint to a different facilitator endpoint in response to the master endpoint receiving an indication that the at least one facilitator endpoint is about to be unavailable.

13. The method of claim 12,
    wherein the at least one facilitator endpoint comprises a first facilitator endpoint and a second facilitator endpoint, wherein the at least one composite video image comprises a first composite video image from the first facilitator endpoint and a second composite video image from the second facilitator endpoint, and
    wherein the video image from the second leaf endpoint is received by the master endpoint as part of the second facilitator composite image.

14. The method of claim 12, wherein the video image from the second leaf endpoint is received by the master endpoint directly from the second leaf endpoint.

15. The method of claim 12, wherein the master endpoint is operable to send the new composite video image to the first and second leaf endpoints.

16. The method of claim 12, further comprising:
    the master endpoint receiving a videoconference call request from at least the first or second leaf endpoint; and
    the master endpoint transmitting instructions to the at least the first or second leaf endpoint to call a facilitator endpoint of the at least one facilitator endpoint.

17. The method of claim 12, further comprising:
    the master endpoint detecting at least one characteristic of at least the first or second leaf endpoints; and
    the master endpoint assigning the at least the first or second leaf endpoint to a specific facilitator endpoint of the at least one facilitator endpoint based on the detected at least one characteristic.

18. The method of claim 12, further comprising:
the master endpoint assigning one or more of the first or second leaf endpoint to a specific facilitator endpoint of the at least one facilitator endpoint based on at least one operable characteristic of the specific facilitator endpoint of the at least one facilitator endpoint.

19. The method of claim 18, wherein the at least one operable characteristic indicates a likelihood of the specific facilitator endpoint of the at least one facilitator endpoint being in use at a time of a current videoconference call.

20. The method of claim 12,
wherein the at least one facilitator endpoint comprises a first facilitator endpoint and a second facilitator endpoint;
wherein the first facilitator endpoint has n inputs and the second facilitator endpoint has m inputs and wherein the master endpoint is operable to support a videoconference call with n+m leaf endpoints through the first and second facilitator endpoints of the at least one facilitator endpoint.

21. The method of claim 12,
wherein the master endpoint has a first number of input ports;
wherein the master endpoint is operable to support a videoconference having a number of facilitator endpoints and leaf endpoints greater than the first number.

22. The method of claim 12,
wherein the master endpoint has a first number of video decoders;
wherein the master endpoint is operable to support a videoconference having a number of facilitator endpoints and leaf endpoints greater than the first number.

23. A system, comprising:
a facilitator endpoint, comprising:
a processor; and
a memory coupled to the processor and configured to store program instructions executable by the processor to:
receive a video image from each of at least two leaf endpoints;
composite at least two of the received video images into a composite video image;
send the composite video image to a master endpoint, wherein the master endpoint is operable to implement a videoconference between a plurality of leaf endpoints, wherein the plurality of leaf endpoints comprises the at least two leaf endpoints; and
send an indication to the master endpoint that the facilitator endpoint is about to be unavailable, wherein the master endpoint is operable to assign the at least two leaf endpoint to a different facilitator endpoint in response to the master endpoint receiving the indication.

24. The system of claim 23, wherein the master endpoint is operable to receive composite video images from two or more facilitator endpoints, separate at least one video image from each of the two or more received composite video images, and composite at least a subset of the separated video images into a new composite video image.

25. The system of claim 24, wherein the master endpoint is further operable to send the new composite video image to at least one leaf endpoint of the plurality of endpoints.

26. The system of claim 24,
wherein the program instructions are further executable to receive audio from each of at least two leaf endpoints of the plurality of endpoints and send the received audio to the master endpoint; and
wherein the program instructions are further executable to form a cumulative audio stream based on one or more of the received audio streams from the master endpoint and send the cumulative audio stream to at least one leaf endpoint.

27. The system of claim 23,
wherein the facilitator endpoint is operable to enable the master endpoint to support a videoconference having a number of facilitator endpoints and leaf endpoints greater than a number of input ports of the master endpoint.

\* \* \* \* \*